(12) United States Patent
Wilenski et al.

(10) Patent No.: US 9,604,403 B1
(45) Date of Patent: Mar. 28, 2017

(54) METHOD OF PROVING THE QUALITY OF A BOND

(71) Applicant: The Boeing Company, Chicago, IL (US)

(72) Inventors: Mark S. Wilenski, Mercer Island, WA (US); Phillip J. Crothers, Hampton East (AU)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/015,518

(22) Filed: Feb. 4, 2016

(51) Int. Cl.
  *B29C 65/00* (2006.01)
  *B29C 65/82* (2006.01)
  *B29K 101/12* (2006.01)
  *B29L 9/00* (2006.01)

(52) U.S. Cl.
  CPC ...... *B29C 65/8253* (2013.01); *B29K 2101/12* (2013.01); *B29L 2009/00* (2013.01)

(58) Field of Classification Search
  CPC ..... B29C 65/8523; B29C 66/97; B29C 66/98; B29C 70/885; B29K 2101/00; B29K 2101/10; B29K 2105/162; B29L 2009/00; B32B 37/1292; B32B 41/00; B32B 2041/04; G01N 2223/629
  USPC .............................. 156/64; 73/150 A, 150 R
  See application file for complete search history.

(56) References Cited

PUBLICATIONS

U.S. Appl. No. 14/504,015, filed Oct. 1, 2014.

*Primary Examiner* — George Koch

(57) ABSTRACT

A method of assessing bond quality of a bond between first and second composite parts may include bonding an indication film to the first composite part. The indication film may include NDI-detectable particles arranged in a pattern and bound to polymer chains located inside particle regions. The polymer chains and particles may be stationary during bonding of the indication film to the first composite part. The method may additionally include bonding the first and second composite parts along an assembly bondline during which the particles in the indication film migrate with the polymer chains. The method may further include NDI-inspection of the assembly bondline by observing the appearance of the particles along a direction locally normal to an in-plane direction of the assembly bondline, and determining the bond quality of the assembly bondline based on particle density in the in-plane direction.

23 Claims, 19 Drawing Sheets

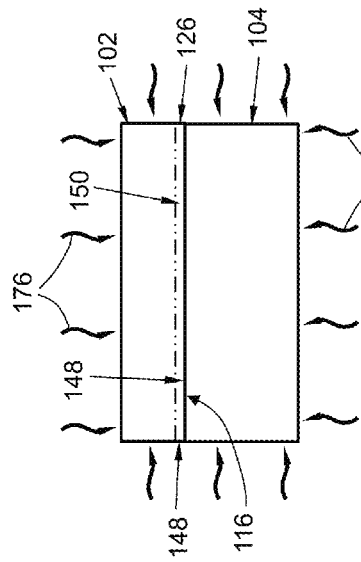
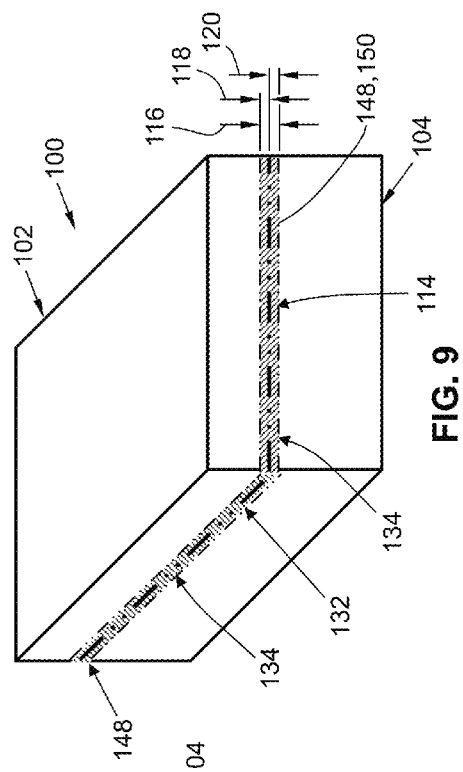
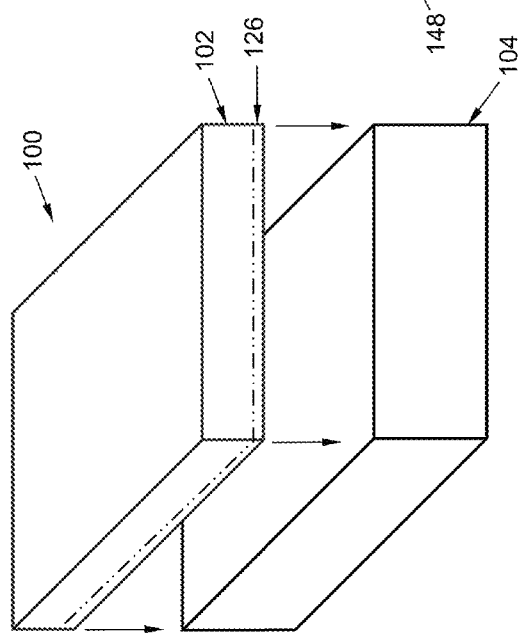

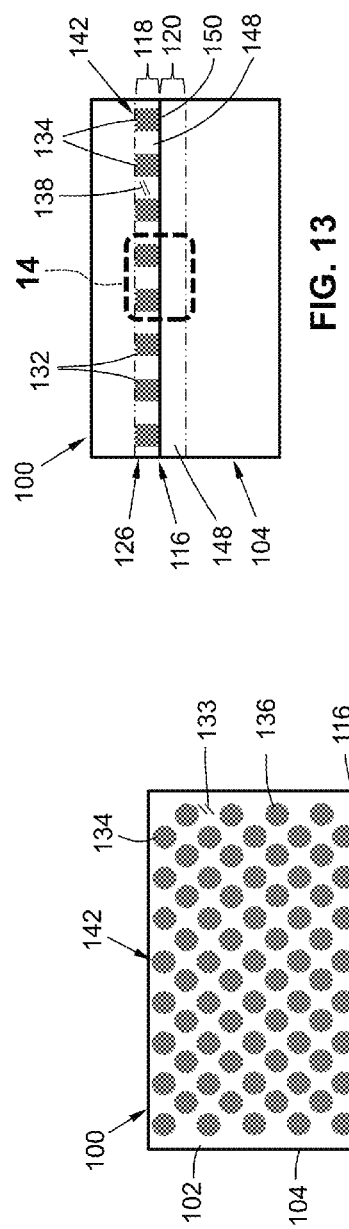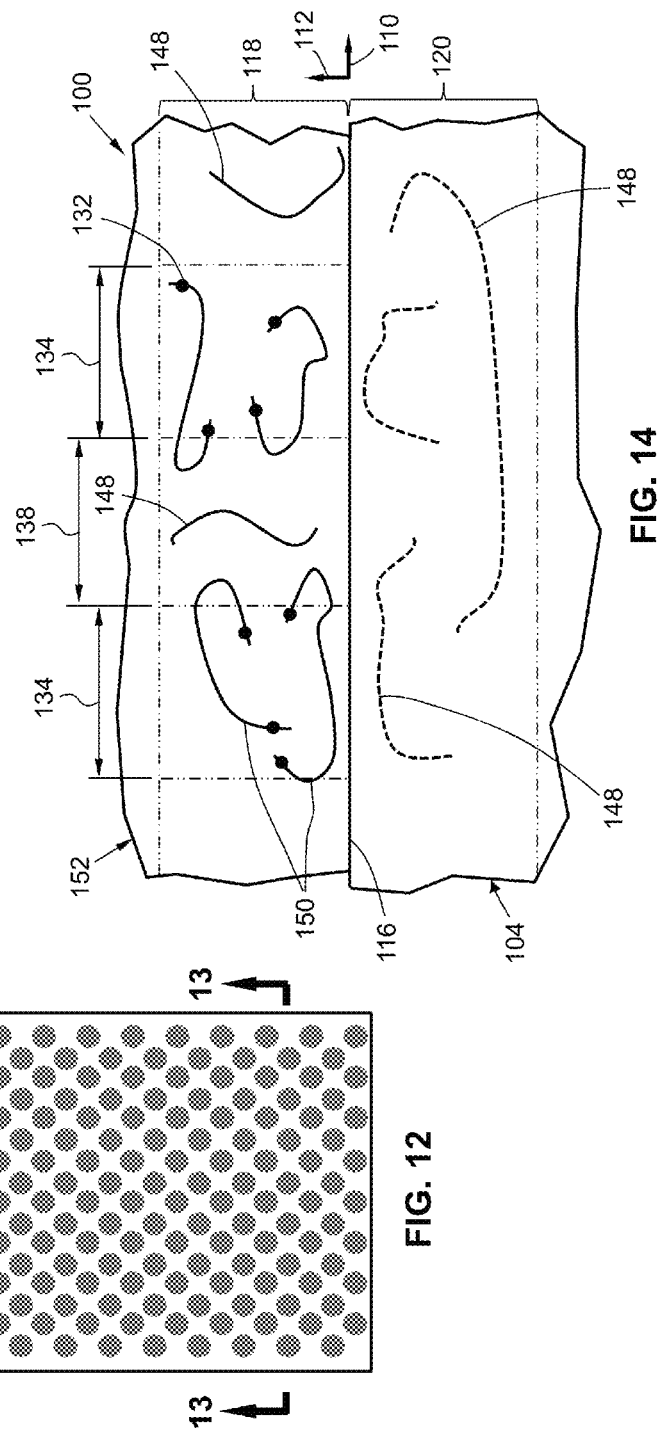
FIG. 13
FIG. 14
FIG. 12

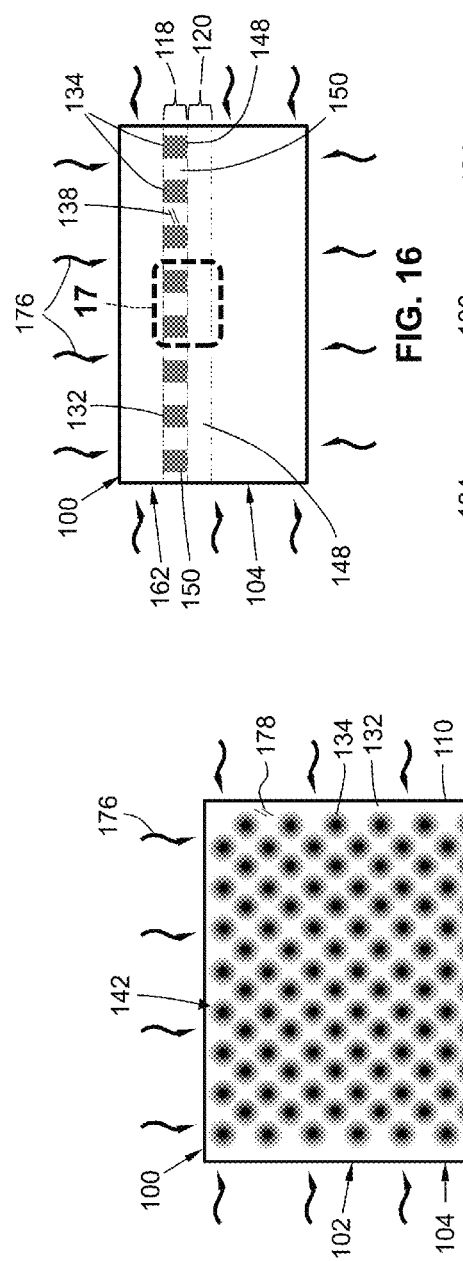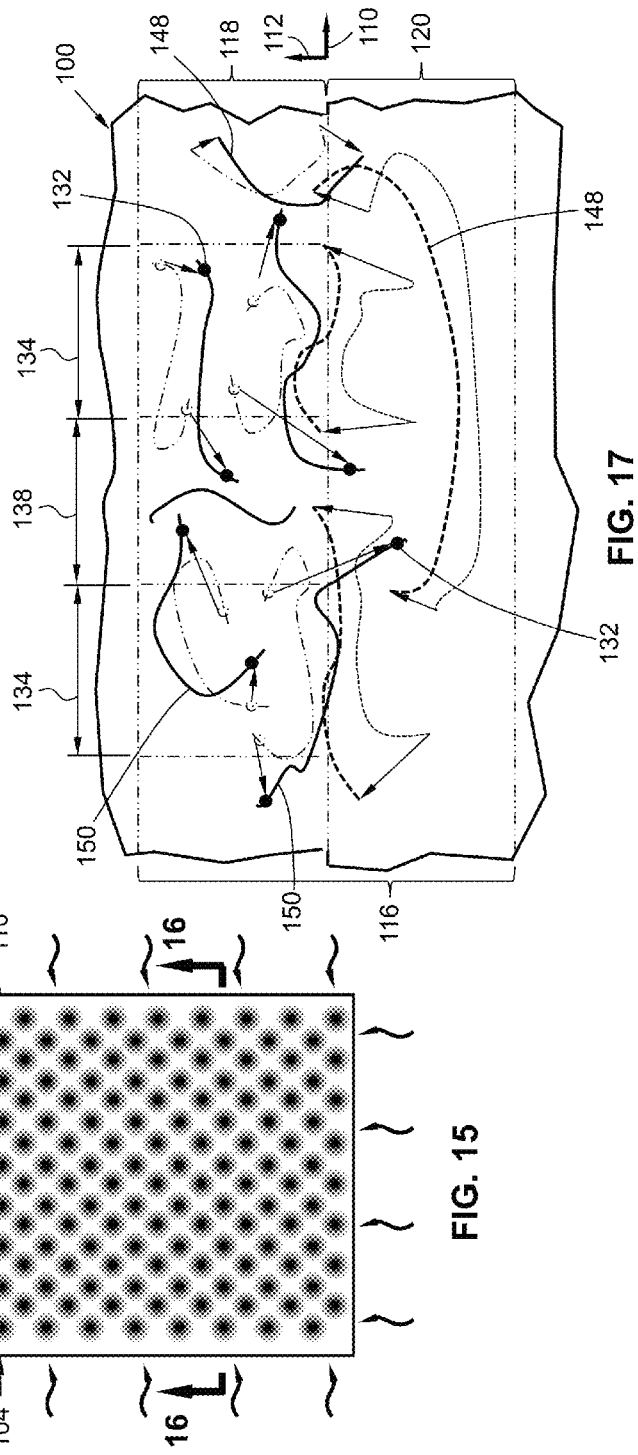

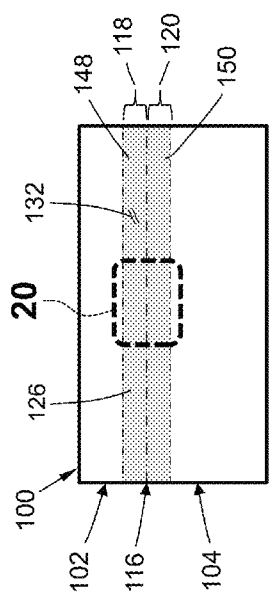
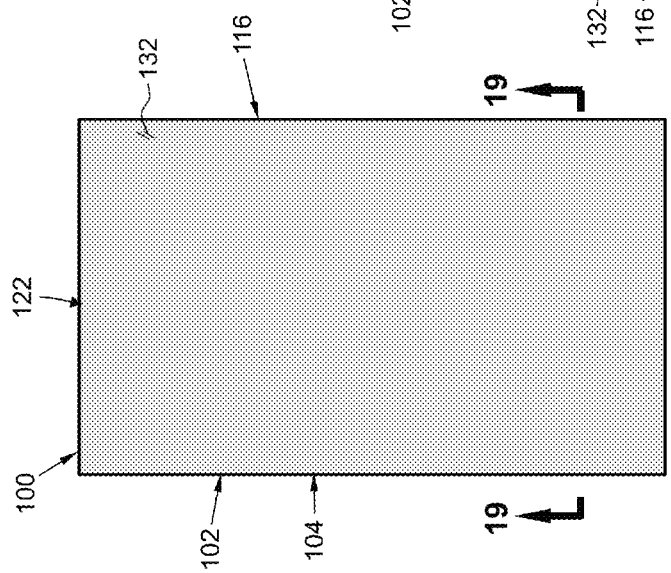
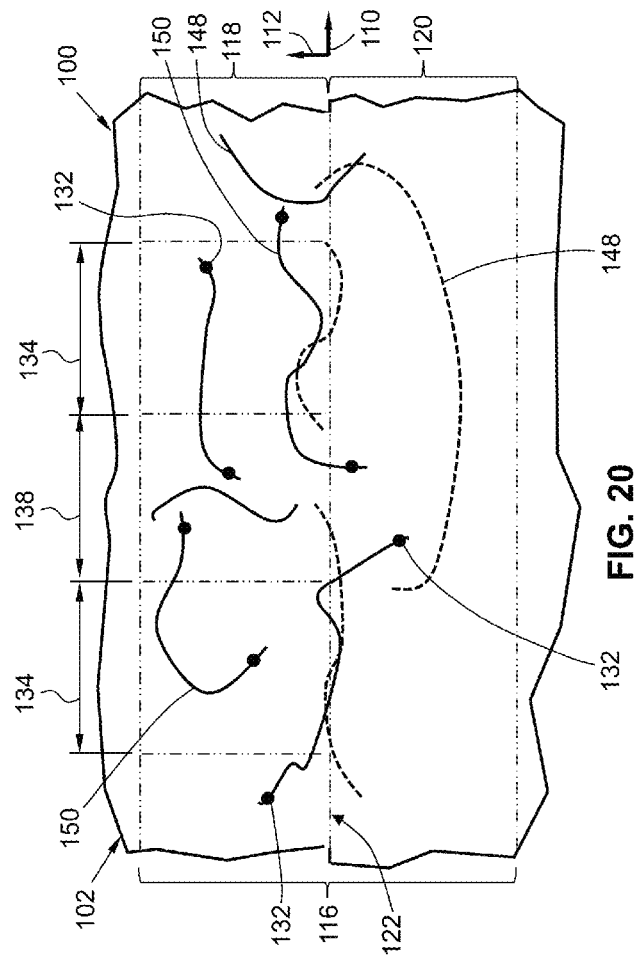

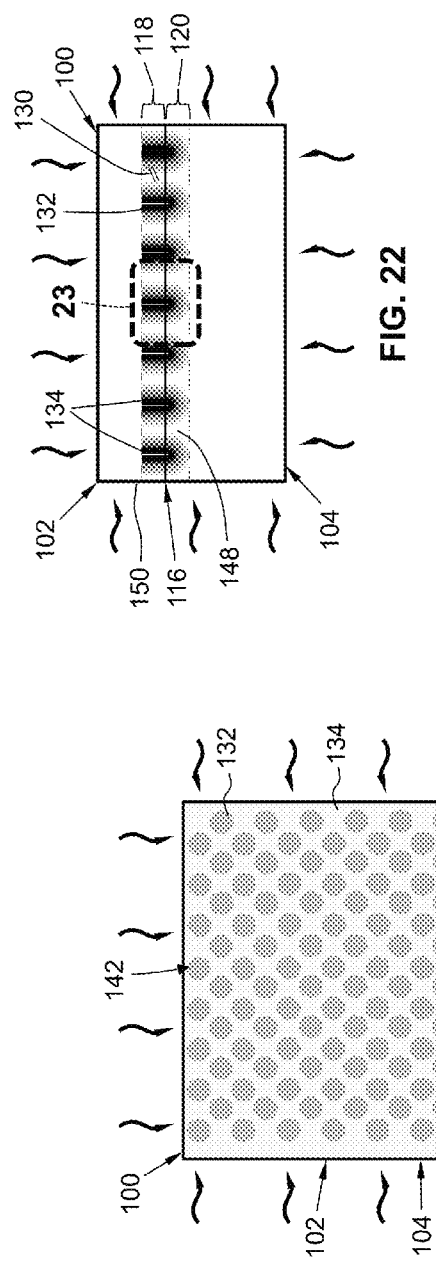
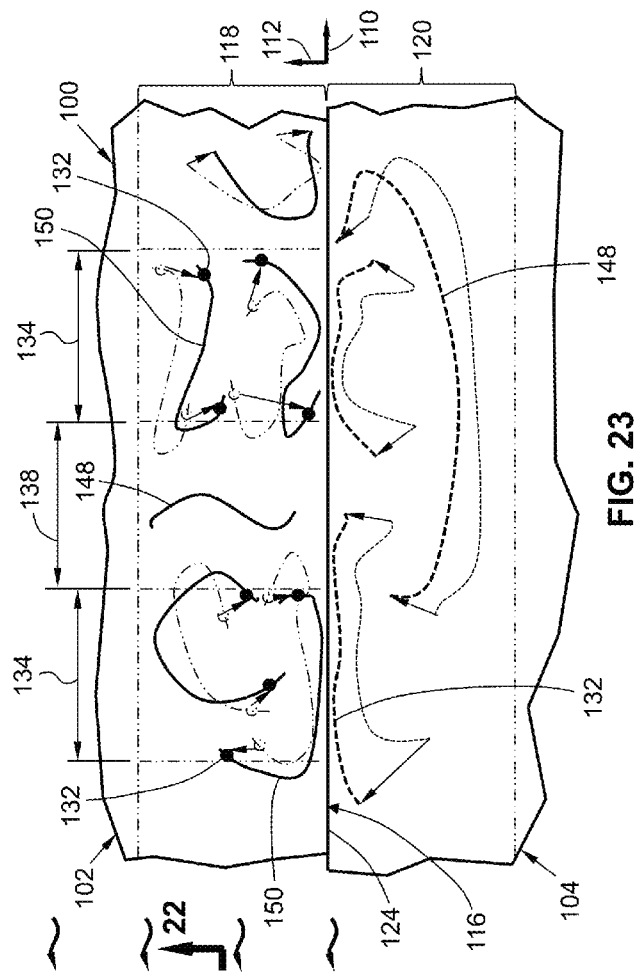
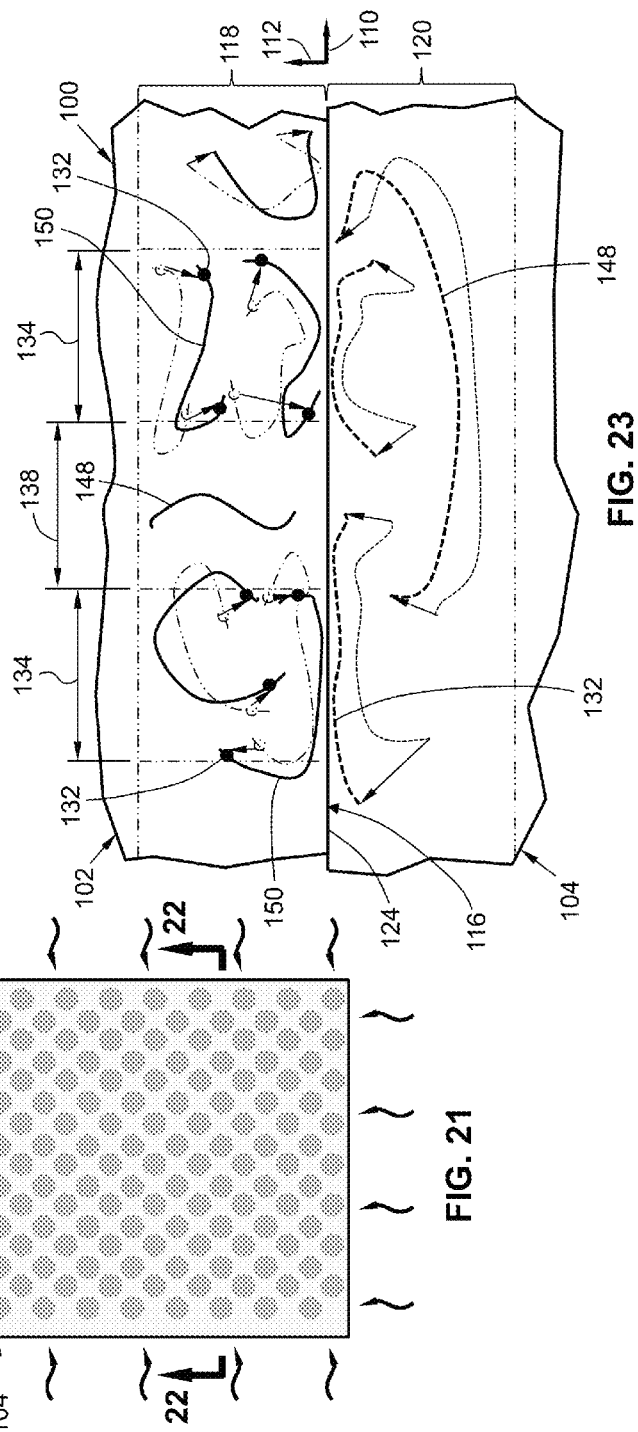
FIG. 21
FIG. 22
FIG. 23

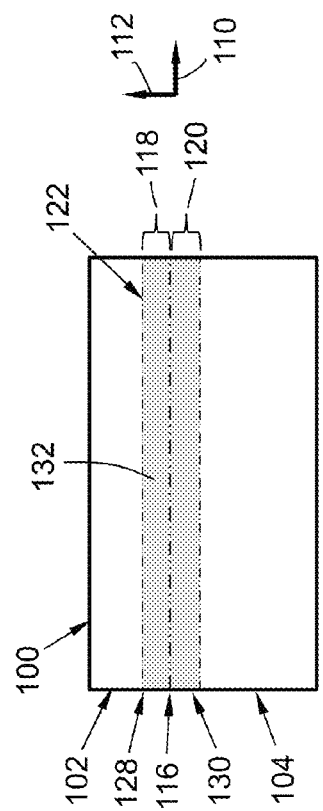
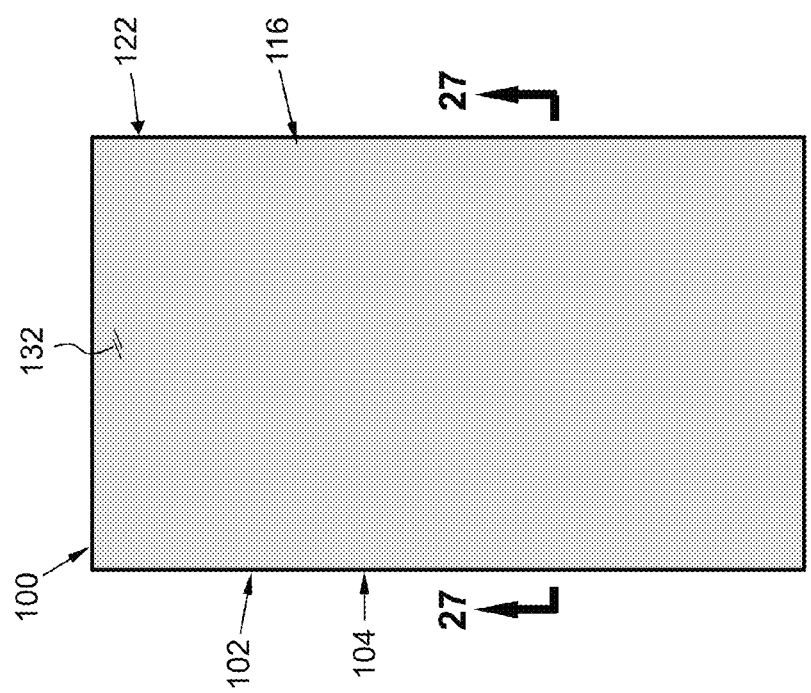

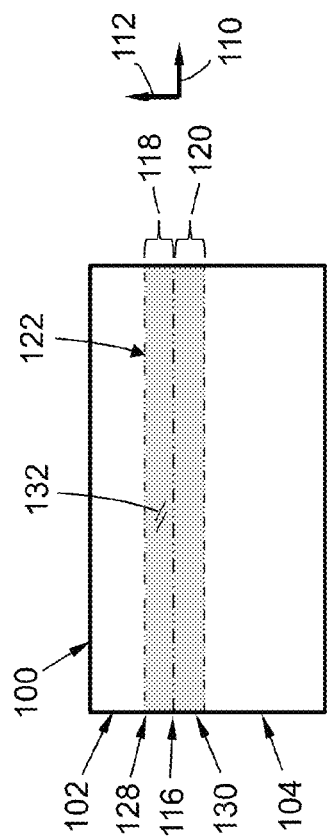
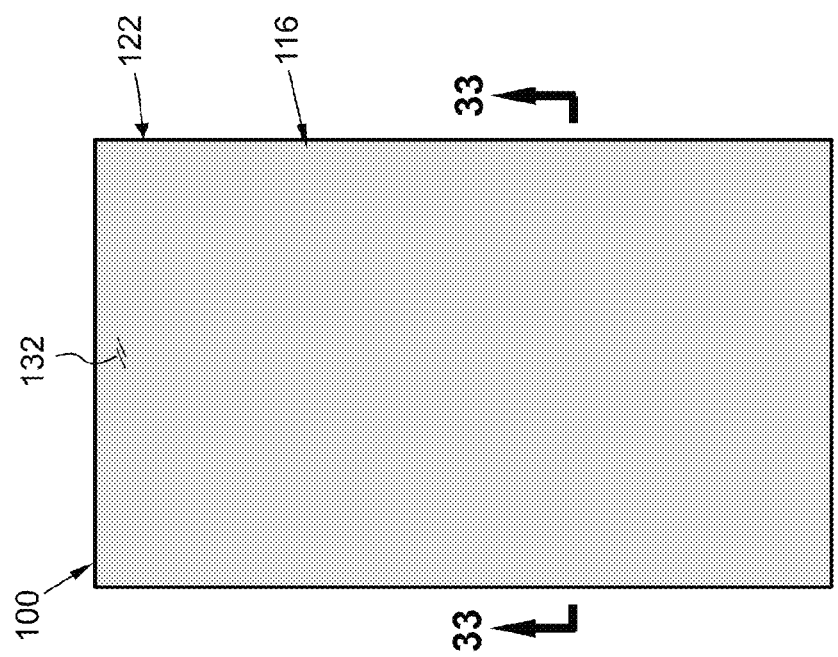

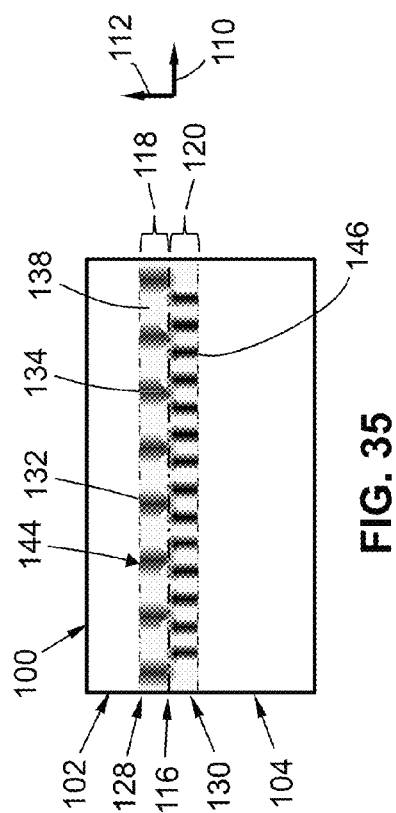
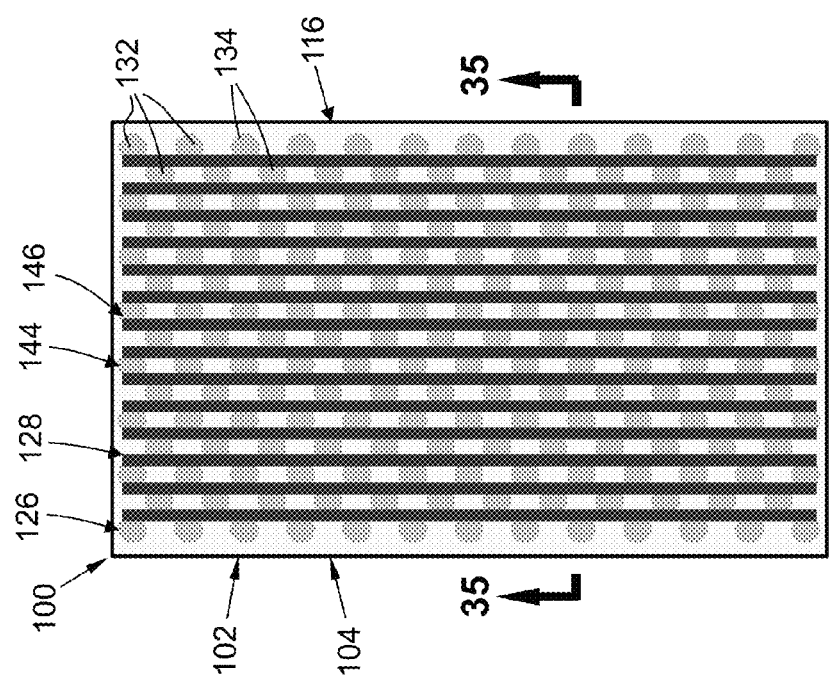

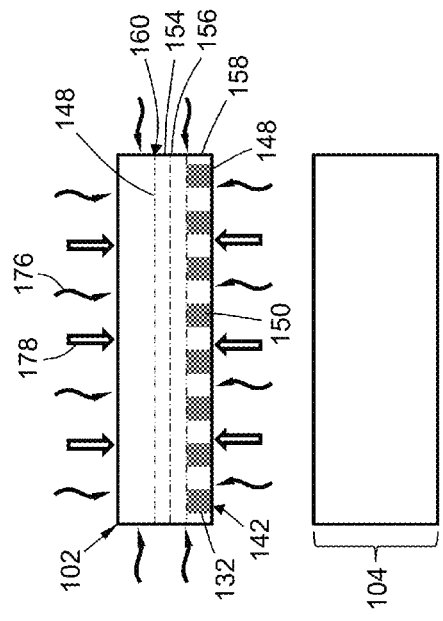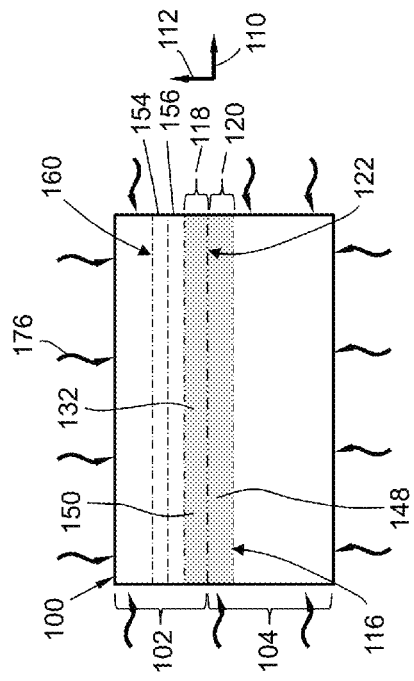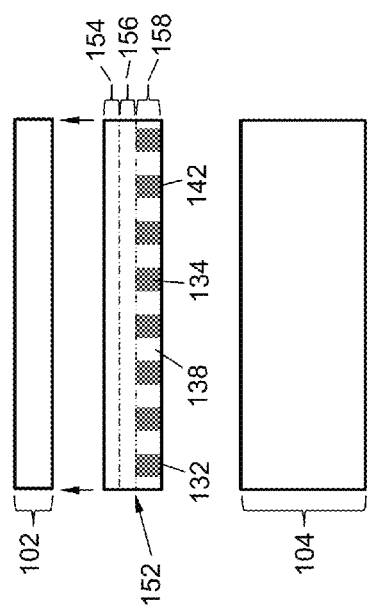

METHOD OF PROVING THE QUALITY OF A BOND

FIELD

The present disclosure relates generally to structural assemblies and, more particularly, to a method of proving the quality of a bond between composite parts.

BACKGROUND

The manufacturing of a structural assembly may involve bonding together two or more composite parts along a bondline. For primary structures, part of the manufacturing process may include verifying the quality of the bond between the composite parts prior to placing the structural assembly into service. The process of verifying bond quality may include determining whether the bond is a mechanically robust bond capable of carrying design loads, or a non-structural kissing bond wherein the composite parts are in intimate contact with one another, but are incompletely bonded to one another such that the bond may be unsuitable for carrying design loads.

Non-destructive inspection is a technique that allows for inspection of a structure prior to placing the structure into service. Unfortunately, conventional non-destructive inspection techniques are incapable of discriminating between a mechanically robust bond and a non-structural kissing bond. If the bond quality in a structural assembly cannot be verified by non-destructive inspection, it may be necessary to install secondary mechanical fasteners in the bondline to ensure that the bondline is capable of carrying design loads. Unfortunately, the installation of mechanical fasteners in the bondline adds to the cost, weight, and manufacturing time of the structural assembly.

Destructive testing may provide a means for discriminating between a mechanically robust bond and a non-structural kissing bond. However, destructive testing cannot be used on structures that are intended to be placed into service. In some cases, a test version of a structure may be manufactured in parallel with the in-service version, and the test version may be tested to failure as a means to confirm that the bond in the in-service version is mechanically robust. Quality control may also be maintained through statistical analysis to confirm that the bond in a structure is mechanically robust. Unfortunately, the use of statistical analysis or parallel manufacturing and destructive testing of a test version of a structure adds to the cost, complexity, and schedule of a production program.

As can be seen, there exists a need in the art for a method for non-destructively proving the quality of a bond between composite parts.

SUMMARY

The above-noted needs associated with proving bond quality between composite parts are specifically addressed and alleviated by the present disclosure which provides a method of assessing bond quality of a bond between first and second composite parts of a structural assembly. The method may include bonding an indication film to the first composite part. The indication film may include NDI-detectable particles arranged in a pattern and bound to polymer chains located inside particle regions of the indication film. The polymer chains and particles may be stationary during bonding of the indication film to the first composite part. The method may additionally include bonding the first and second composite parts along an assembly bondline during which the particles in the indication film migrate with the polymer chains. The method may further include NDI-inspection of the assembly bondline to observe the appearance of the particles along a direction locally normal to an in-plane direction of the assembly bondline, and determining the bond quality of the assembly bondline based on particle density in the in-plane direction.

In a further embodiment, disclosed is a method of assessing bond quality of a bond between first and second composite parts. The method may include bonding an indication film to the first composite part and bonding an indication film to the second composite part. Each one of the indication films may be comprised of polymer chains. In addition, each one of the indication films may include NDI-detectable particles arranged in a pattern of particle regions and bound to the polymer chains located inside the particle regions to define tagged polymer chains. The tagged polymer chains and particles may be stationary during bonding of the indication films to the first and second composite parts. The method may additionally include mating the first composite part to the second composite part such that the indication films are in contacting relation to one another along an assembly bondline. In addition, the method may include bonding the first composite part to the second composite part along the assembly bondline during which the particles in the indication films migrate with the tagged polymer chains. The method may also include inspecting, using a non-destructive inspection (NDI) technique, the assembly bondline by observing the appearance of the particles along a direction locally normal to an in-plane direction of the assembly bondline. Furthermore, the method may include determining the bond quality of the assembly bondline based on particle density in the in-plane direction.

In a still further embodiment, disclosed is a method of assessing bond quality of a bond between first and second composite parts. The method may include bonding a multi-layer indication film to the first composite part. The multi-layer indication film may include a part adhesive layer and an assembly adhesive layer fused together by an insoluble layer. The assembly adhesive layer may be comprised of polymer chains and include particles arranged in a pattern of particle regions. The particles may be bound to the polymer chains located inside the particle regions to define tagged polymer chains. The particles may be detectable by non-destructive inspection. The tagged polymer chains and particles may be stationary (non-migrating) during bonding of the part adhesive layer to the first composite part. The method may further include applying the first composite part to the second composite part such that the assembly adhesive layer of the indication film of the first composite part is in contacting relation to the second composite part along an assembly bondline. In addition, the method may include bonding the first composite part to the second composite part along the assembly bondline during which the particles in the assembly adhesive layer migrate with the tagged polymer chains. Furthermore, the method may include inspecting, using a non-destructive inspection (NDI) technique, the assembly bondline by observing the appearance of the particles along a direction locally normal to an in-plane direction of the assembly bondline. The method may also include determining the bond quality of the assembly bondline based on particle density in the in-plane direction.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 7 is an exploded view of the first composite part and the second composite part;

FIG. 8 is a side view of the bonding of the first composite part to the second composite part along an assembly bondline at an interface between the indication film and the second composite part;

FIG. 9 is a perspective view of the first composite part bonded to the second composite part along the assembly bondline;

FIG. 12 is a top view of an NDI image of an assembly bondline of a structural assembly showing an example of a pattern of particles in the assembly bondline prior to thermal cycling (e.g., heating) for bonding the first composite part to the second composite part;

FIG. 13 is a section view of the structural assembly taken along line 13 of FIG. 12 and illustrating the pattern of particles in the indication film prior to bonding the first composite part to the second composite part;

FIG. 14 is a magnified view of a portion of the assembly bondline taken along line 14 of FIG. 13 and illustrating particles in the particle regions bound to first polymer chains (e.g., tagged polymer chains) of the first composite part and illustrating second polymer chains of the second composite part;

FIG. 15 is a top view of an NDI image of the assembly bondline of FIG. 12 during thermal cycling (e.g., heating) during the process of bonding the first composite part to the second composite part;

FIG. 16 is a section view taken along line 16 of FIG. 15 and illustrating the pattern of particles and the application of heat during the bonding process;

FIG. 17 is a magnified view of a portion of the assembly bondline taken along line 17 of FIG. 16 and illustrating the migration of the polymer chains in an in-plane direction and a through-thickness direction;

FIG. 18 is a top view of an NDI image of the assembly bondline of FIG. 12 at the conclusion of thermal cycling of the bonding process and illustrating substantially uniform particle density in the in-plane direction throughout the assembly bondline and representing a mechanically robust bond;

FIG. 19 is a section view taken along line 19 of FIG. 18 and illustrating substantially uniform particle density in the through-thickness direction throughout the assembly bondline;

FIG. 20 is a magnified view of a portion of the assembly bondline taken along line 20 of FIG. 19 and illustrating migration and penetration of particles with the tagged polymer chains of the first composite part into the second composite part, and migration and penetration of the polymer chains of the second composite part into the first composite part;

FIG. 21 is a top view of an NDI image of the assembly bondline at the conclusion of thermal cycle and illustrating non-uniform particle density in the in-plane direction as represented by the presence of the original particle pattern;

FIG. 22 is a section view taken along line 22 of FIG. 21 and illustrating non-uniform particle density in the through-thickness direction;

FIG. 23 is a magnified view of a portion of the assembly bondline taken along line 23 of FIG. 22 and illustrating insufficient migration of the polymer chains resulting in a non-structural kissing bond between the first and second composite parts;

FIG. 26 is a top view of an NDI image of the assembly bondline of FIG. 24 at the conclusion of thermal cycling of the bonding process and illustrating substantially uniform particle density in the in-plane direction throughout the assembly bondline;

FIG. 27 is a section view taken along line 27 of FIG. 26 and illustrating substantially uniform particle density in the through-thickness direction for the particles in the first indication film and the second indication film;

FIG. 32 is a top view of an NDI image of the assembly bondline of FIG. 30 and illustrating substantially uniform particle density in the in-plane direction due to uniform dispersion of the particles in the first indication film and the second indication film;

FIG. 33 is a section view taken along line 33 of FIG. 32 and illustrating substantially uniform particle density in the through-thickness direction;

FIG. 34 is a top view of an NDI image of the assembly bondline of FIG. 30 and illustrating non-uniform particle density in the in-plane direction as represented by the presence of the first pattern and the second pattern;

FIG. 35 is a section view taken along line 35 of FIG. 34 and illustrating non-uniform particle density in the through-thickness direction;

FIG. 36 is an exploded side view of an example of a structural assembly comprised of a first composite part and a second composite part prior to bonding together using a multi-layer indication film during the bonding process progressively illustrated in FIGS. 37-39;

FIG. 37 is a side view of the structural assembly of FIG. 36 and illustrating the bonding of the multi-layer indication film to the first composite part;

FIG. 38 is an exploded view of the multi-layer indication film bonded to the first composite part prior to bonding to the second composite part;

FIG. 39 illustrates the bonding of the first composite part to the second composite part and showing substantially uniform particle density in the through-thickness direction along the assembly bondline;

DETAILED DESCRIPTION

Figure 1:
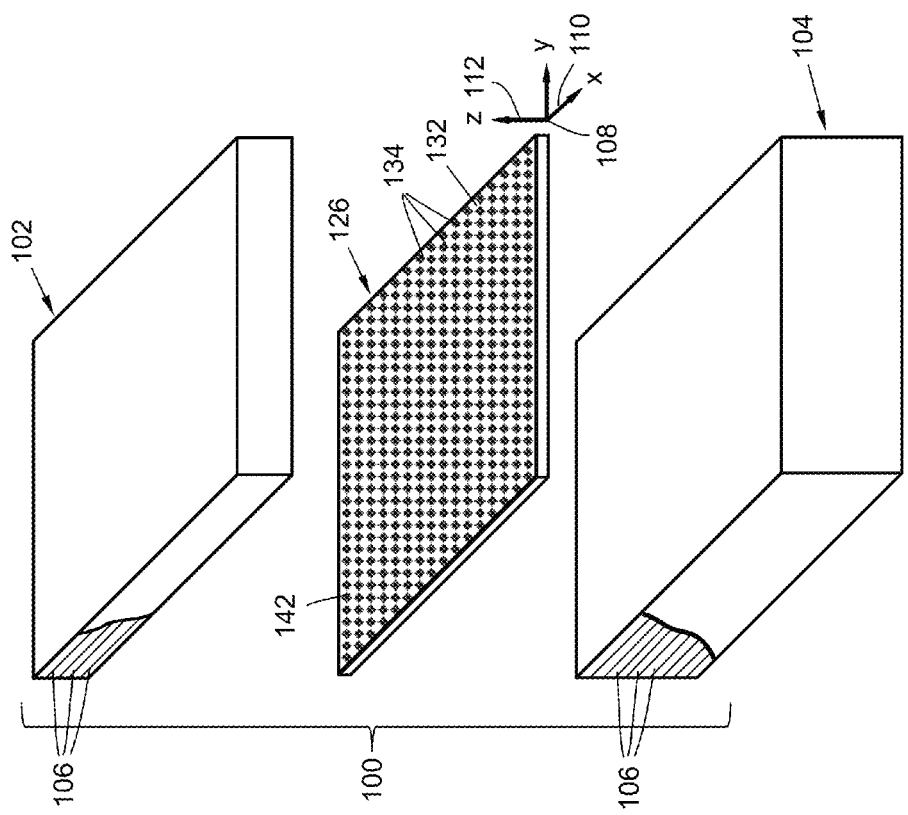
FIG. 1 is a an exploded view of an example of a structural assembly comprising a first composite part, a second composite part, and an indication film.

Referring now to the drawings wherein the showings are for purposes of illustrating various embodiments of the present disclosure, shown in FIG. 1 is an exploded view of an example of a structural assembly 100 having a first composite part 102, a second composite part 104, and an indication film 126 interposed between the first and second composite parts 102, 104. The first composite part 102 and/or the second composite part 104 may be formed of fiber-reinforced polymer matrix material. The matrix material or resin may be a thermosetting matrix material and/or a thermoplastic matrix material. As described in greater detail below, the indication film 126 may be formed of non-fibrous polymeric material, and includes species or particles 132 that are detectable using non-destructive inspection (NDI) techniques. The NDI-detectable particles 132 in the indication film 126 are arranged in a pattern 142 of particle regions 134. Each particle region 134 may contain multiple particles 132.

Figure 2:
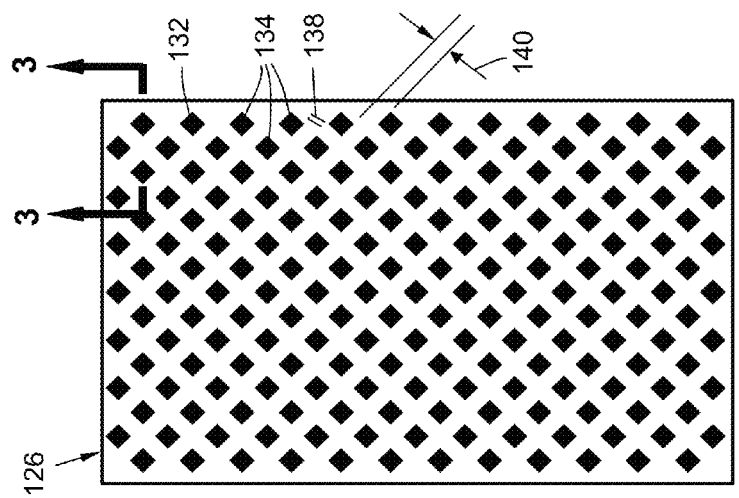
FIG. 2 is a top view of an example of an indication film having particles arranged in particle regions formed in a pattern.

FIG. 2 is a top view of an example of a pattern 142 (FIG. 1) of particle regions 134. The particle regions 134 are separated by blank regions 138 which are devoid of particles 132. In the example shown, each particle region 134 has a diamond shape. In addition, the particle regions 134 are generally aligned with one another and are uniformly spaced apart. However, as indicated below, a pattern 142 of particle regions 134 may be provided in any one of a variety of different sizes, shapes, and configurations, without limitation.

Figure 3:
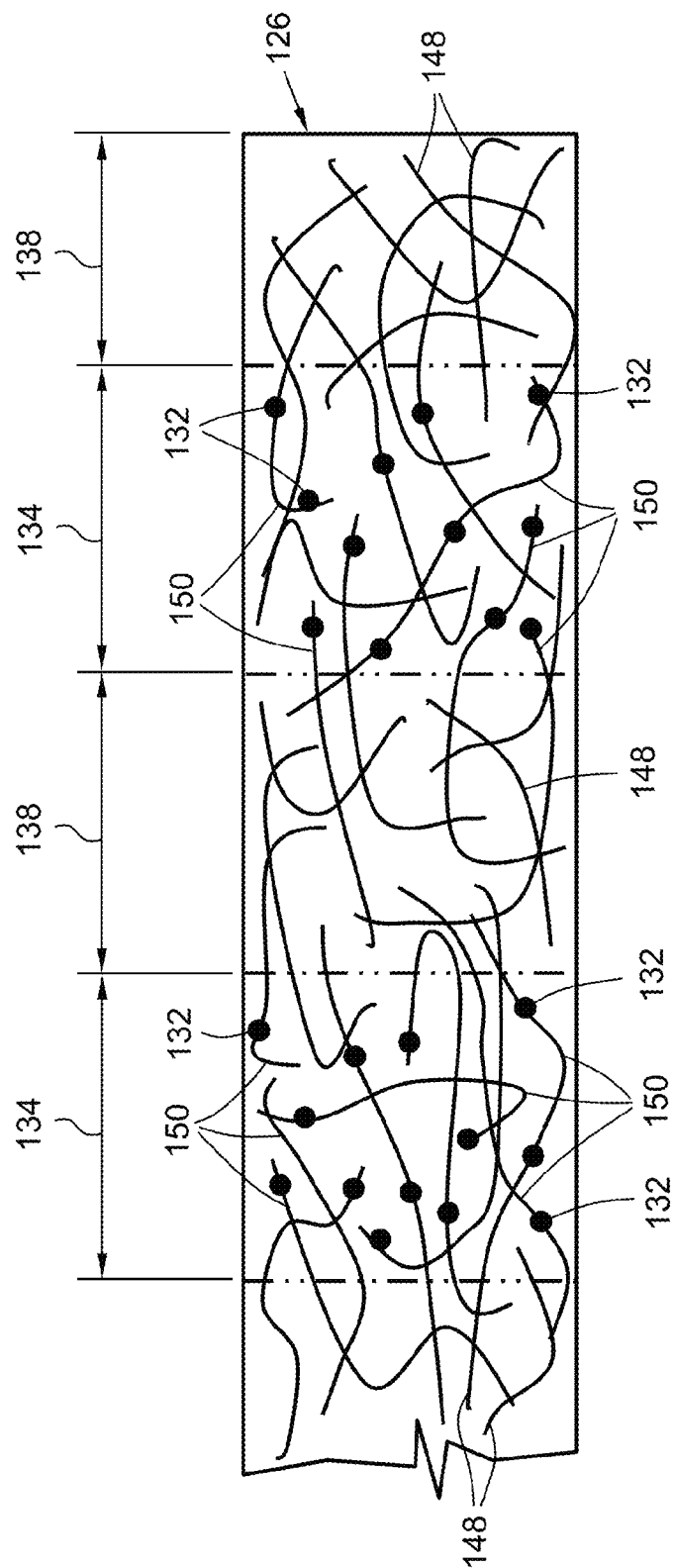
FIG. 3 is a section view of the indication film taken along line 3 of FIG. 2 and illustrating particles in the particle regions bound to polymer chains of the indication film and forming tagged polymer chains.

FIG. 3 is a section view of the indication film 126 of FIG. 2. In some examples, the indication film 126 may be provided in a thickness of up to approximately 0.30 inch. More preferably, the indication film 126 may be provided in a thickness of up to approximately 0.10 inch and as small as approximately 0.001 inch (1 mil). In the indication film 126, the particles 132 in the particle regions 134 are bound to the polymer chains 148 that make up the indication film 126. In the present disclosure, a polymer chain 148 to which one or more particles 132 is bound may be described as a tagged polymer chain 150. As indicated above, the particles 132 in the indication film 126 are initially confined to the particle regions 134 and may be bound (e.g., covalently bonded) to the polymer chains 148 located in the particle regions 134 and/or to the portions of the polymer chains 148 located in the particle regions 134. Although FIG. 3 illustrates some of the polymer chains 148 overlapping into the particle regions 134 and the blank regions 138, an indication film 126 may be provided in an arrangement wherein the polymer chains 148 in the particle regions 134 do not overlap into the blank regions 138, and/or vice versa.

In the present disclosure, the NDI-detectable particles 132 are used to prove the quality of the bond 114 in the assembly bondline 116 between the first composite part 102 and the second composite part 104. In this regard, at least some of the polymer chains 148 in the indication film 126 do not migrate during bonding of the indication film 126 to the first composite part 102. However, the tagged polymer chains 150 and therefore the particles 132 are configured to migrate during bonding of the first composite part 102 to the second composite part 104. Because migration of the NDI-detectable particles 132 of the tagged polymer chains 150 only occurs during bonding of the first composite part 102 to the second composite part 104, NDI-detectable changes in the appearance of the pattern 142 after completion of the bonding process can be used to confirm that a mechanically robust bond 122 has formed between the first composite part 102 and the second composite part 104.

For example, NDI-imaging of the assembly bondline 116 (FIG. 10) may reveal a substantially uniform particle density in the in-plane direction 110 (e.g., the xy-direction of reference coordinate system 108 in FIG. 1) of the assembly bondline 116 which may be correlated to migration of the polymer chains 148 in the through-thickness direction 112 (e.g., z-direction of the reference coordinate system 108 in FIG. 1) across the interface between the first and second composite parts 102, 104. In this regard, a substantially uniform particle density (e.g., FIG. 18) in the in-plane direction 110 of the assembly bondline 116 may indicate that a mechanically robust bond 122 (e.g., FIG. 20) has formed between the first and second composite parts 102, 104. In contrast, NDI-imaging of the assembly bondline 116 showing the appearance of the original pattern 142 (e.g., FIG. 21) of particle regions 134 may indicate that insufficient migration of the polymer chains 148 has occurred in the in-plane direction 110. Insufficient migration of the polymer chains 148 along the in-plane direction 110 may correspond to insufficient migration of the polymer chains 148 in the through-thickness direction 112, and which may indicate that a low-strength or non-structural kissing bond 124 (e.g., FIG. 23) has formed between the first and second composite parts 102, 104.

Figure 5:
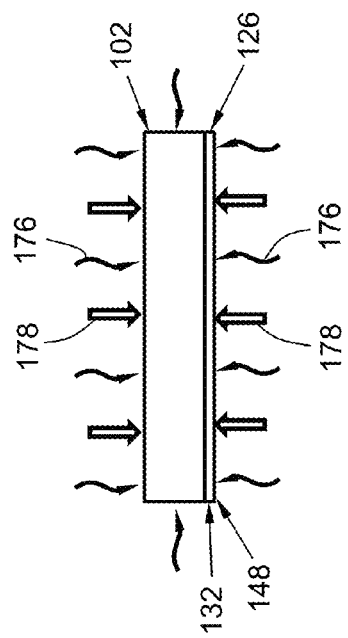
FIG. 5 is a side view of the bonding of the indication film to the first composite part under heat and compaction pressure.
Figure 6:
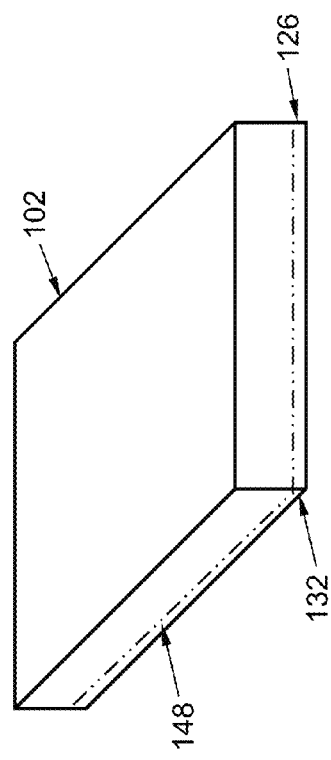
FIG. 6 is a perspective view of the first composite part with the indication film bonded to one side.
Figure 4:
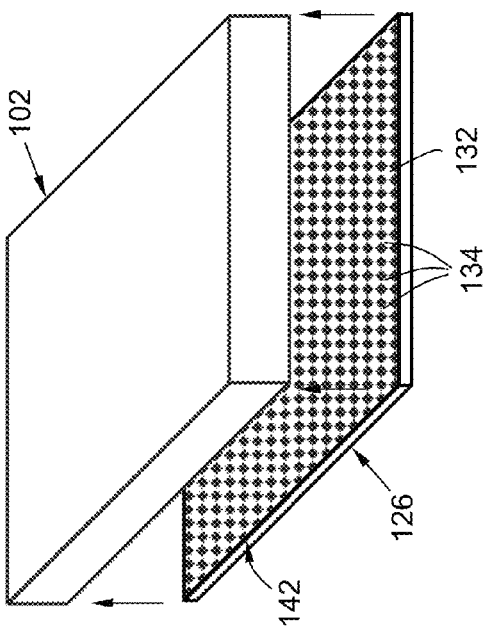
FIG. 4 is an exploded view of the indication film and the first composite part.

FIG. 4 is an exploded view of the indication film 126 and the first composite part 102 prior to bonding. FIG. 5 shows a side view of the indication film 126 during bonding to the first composite part 102. Heat 176 and/or compaction pressure 178 may be applied to facilitate the bonding process. As described in greater detail below, the first composite part 102 may be uncured prior to bonding the indication film 126 to the first composite part 102. For example, the first composite part 102 may be formed of one or more prepreg composite plies. The application of heat 176 and/compaction pressure 178 may facilitate the consolidation and curing of the uncured composite plies while co-bonding the indication film 126 to the first composite part 102. Alternatively, the first composite part 102 may be provided as a cured composite part to which the indication film 126 may be bonded. FIG. 6 is a perspective view of the first composite part 102 with the indication film 126 bonded to one side.

FIG. 7 shows the first composite part 102 and the second composite part 104 prior to assembly. The second composite part 104 may be formed of cured or uncured composite material. The first composite part 102 may be assembled with the second composite part 104 along an assembly bondline 116 as shown in FIG. 8. In FIG. 8, the first composite part 102 may be bonded to the second composite part 104 along the assembly bondline 116 at the interface between the indication film 126 and the second composite part 104. Heat 176 may be applied to initiate or facilitate the bonding process, and may facilitate the migration of polymer chains 148 across the interface between the first and second composite parts 102, 104.

FIG. 9 shows the first composite part 102 bonded to the second composite part 104 along the assembly bondline 116. The assembly bondline 116 may be made up of a first bondline portion 118 of the first composite part 102, and a second bondline portion 120 of the second composite part 104. A bondline portion may be described as the portion of a composite part containing polymer chains 148 that at least partially migrate across the interface between the first composite part 102 and the second composite part 104 during the bonding process. Although the presently-disclosed method is described and illustrated in the context of relatively simple orthogonally-shaped first and second composite parts 102, 104, the method may be implemented for proving the bond quality in the assembly bondline 116 between two or more composite parts of any size, shape, and configuration, without limitation.

Figure 10:
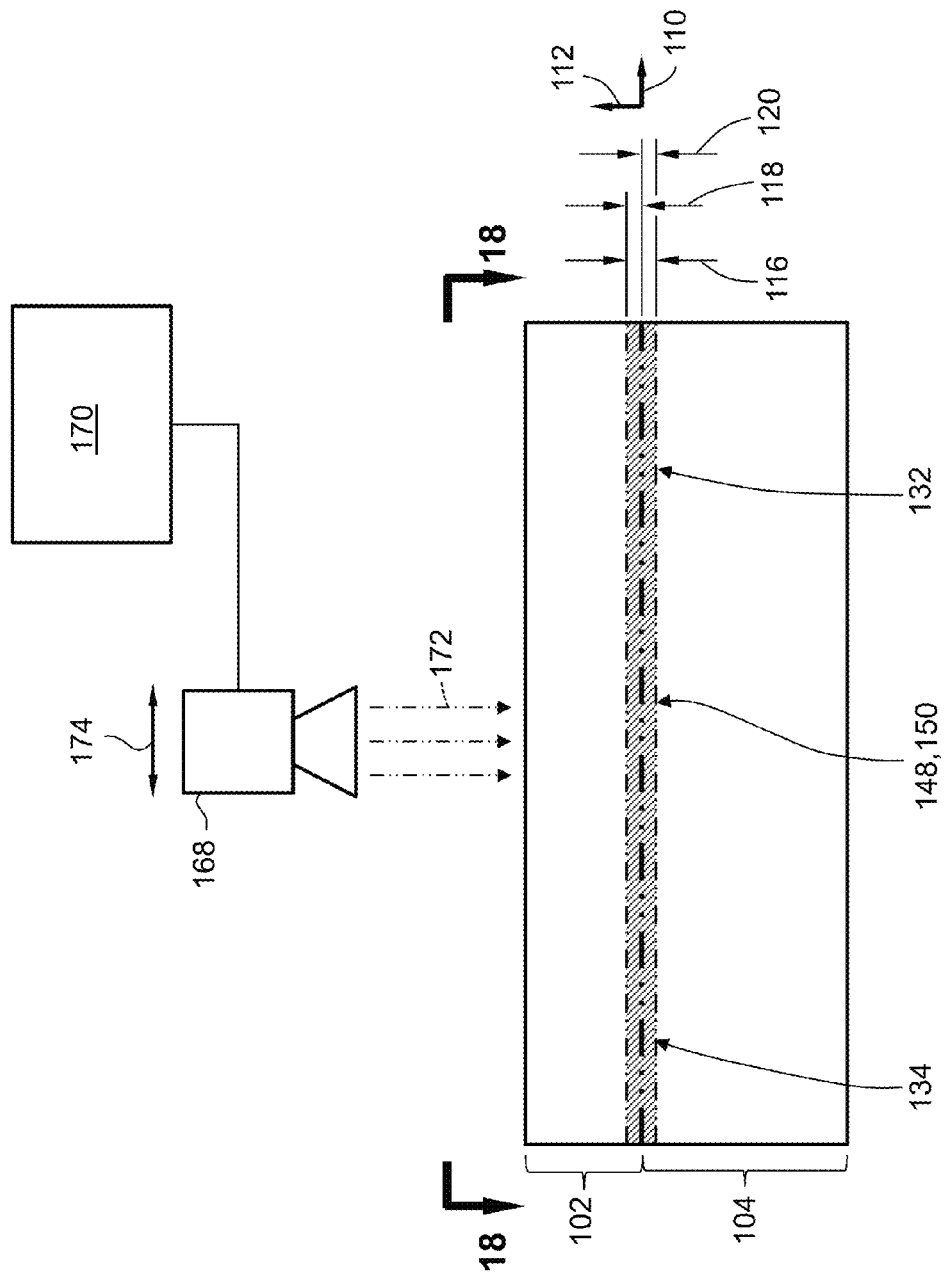
FIG. 10 is a side view of the structural assembly and illustrating a non-destructive inspection (NDI) device inspecting the bond quality of the assembly bondline.

FIG. 10 is a side view of the structural assembly 100 and an example of non-destructive inspection (NDI) of the assembly bondline 116 using an NDI device 168. Advantageously, in the present disclosure, the NDI device 168 may be configured to inspect the assembly bondline 116 by generating images of the assembly bondline 116 taken along a direction locally normal to the assembly bondline 116. Although the assembly bondline 116 in the present disclosure is shown as being generally planar, the assembly bondline 116 may be contoured in any direction along any or all portions of the assembly bondline 116. For example, the assembly bondline 116 may have a simple two-dimensional curvature, and/or the assembly bondline 116 may have a complex or three-dimensional curvature along any or all portions of the assembly bondline 116. Advantageously, the ability to image the assembly bondline 116 along a locally normal direction significantly simplifies the inspection process. In addition, structural assemblies of any size, shape, and configuration can be inspected as long as the NDI device 168 can be oriented such that the imaging direction 172 is oriented substantially locally normal to the assembly bondline 116. For example, the imaging direction 172 may be oriented within approximately 20 degrees of a local normal (not shown) to the assembly bondline 116.

As described below, the NDI device 168 (FIG. 10) may be coupled to a signal processor 170. The signal processor 170 may receive signals from the NDI device 168. The signals may be representative of NDI images generated by the NDI device 168 during inspection (e.g., imaging) of the assembly bondline 116 of a structural assembly 100. The signal processor 170 may be configured to analyze the NDI images, and determine the bond quality between the first and second composite parts 102, 104 based upon the appearance of the NDI images. For example, bond quality may be determined by measuring the degree with which particle density varies across the assembly bondline 116 in an in-plane direction 110, and comparing the variation in in-plane particle density to a predetermined variation threshold. Alternatively, bond quality may be determined by comparing the in-plane particle density of the assembly bondline 116 of the structural assembly 100 to the in-plane particle density of the assembly bondline 116 of a reference standard (not shown) for which the in-plane direction 110 migration of the polymer chains 148 has been correlated to a minimum level of through-thickness direction 112 (e.g., z-direction) migration of polymer chains 148 that has been determined (e.g., through laboratory testing) to represent a mechanically robust bond 122.

Figure 11:
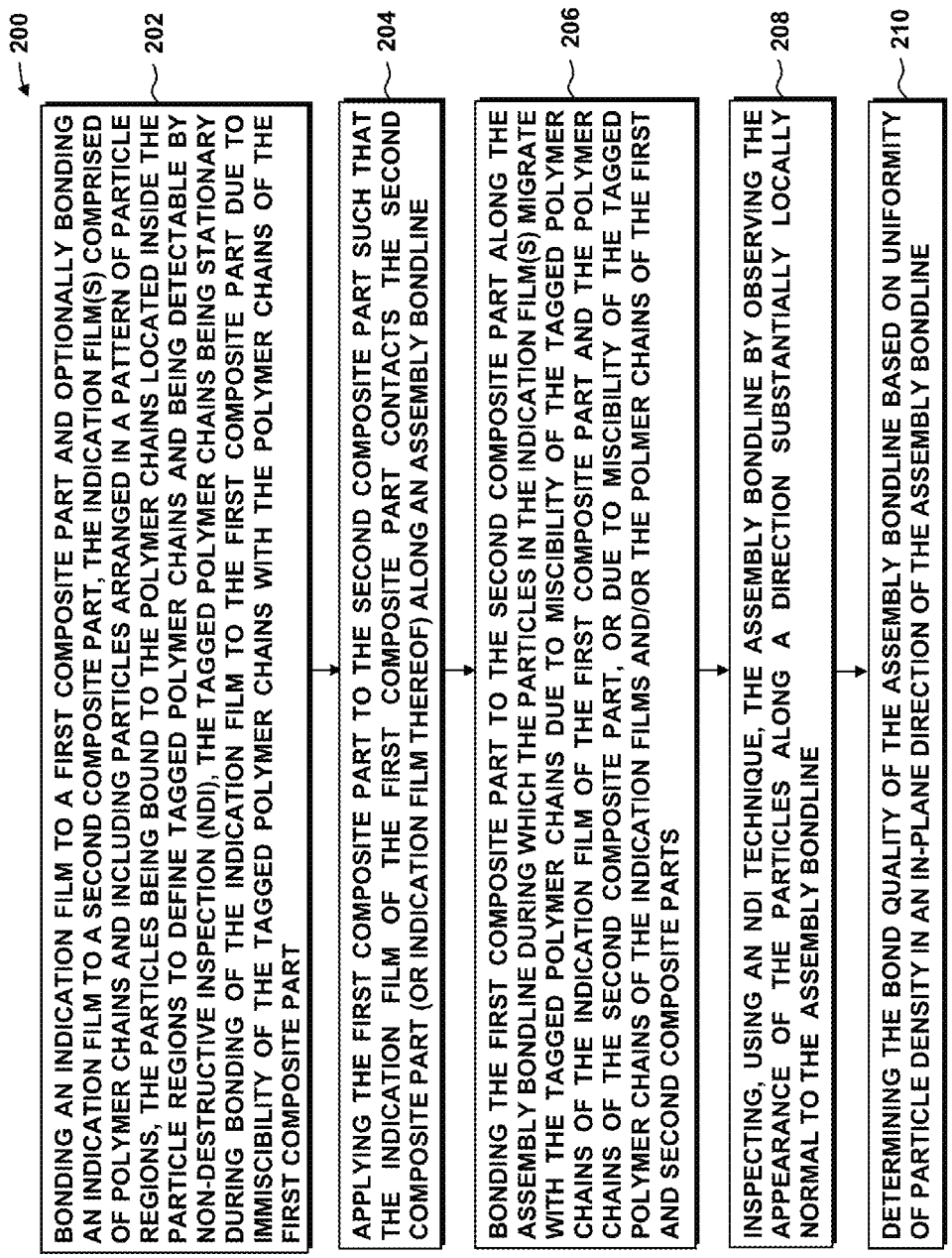
FIG. 11 is a flowchart having one or more operations that may be included in a method of assessing bond quality of a bond between a first composite part and a second composite part.

Referring now to FIG. 11 shown is a flowchart having one or more operations that may be included in an example of a method of assessing or proving the bond quality of an assembly bondline 116 between a first composite part 102 and a second composite part 104 of a structural assembly 100. The method of FIG. 11 is described with reference to FIGS. 1-10 and 12-45.

Step 202 of the method 200 may include bonding an indication film 126 to a first composite part 102 as mentioned above with reference to FIGS. 4-6. The process of bonding the indication film 126 may include positioning the indication film 126 on the first composite part 102 which may be configured as a laminate of uncured composite plies or a laminate of cured composite plies. In some examples, the indication film 126 may be at least partially comprised of thermoplastic material. However, in other examples, the indication film 126 may be a blend of thermoplastic material and thermosetting material. In still further examples, the indication film 126 may be comprised of a thermoset material. The first composite part 102 may be formed as a prepreg composite laminate containing at least one prepreg composite ply 106. The prepreg composite plies may include continuous reinforcing fibers (not shown) which may be provided in a unidirectional arrangement, a bi-directional arrangement, or in other multi-directional arrangements. In other examples, the first composite part 102 may be formed as a dry fiber preform (not shown) configured to be infused with resin using any one of a variety of resin infusion processes including, but not limited to, resin transfer molding (RTM), resin film infusion (RFI), and other resin infusion methods. The dry fiber preform may be a dry fiber mat with short, chopped fibers, or the dry fiber preform may be comprised of one or more dry fiber plies which may be unidirectional, bidirectional or other continuous fiber forms.

As mentioned above, the indication film 126 may be comprised of polymer chains 148 of one or more types, and may include particles 132 arranged in a pattern 142 of particle regions 134 as shown in FIGS. 12-13. The particles 132 may be bound to the polymer chains 148 (e.g., forming tagged polymer chains 150) by covalent bonding, ionic bonding, hydrogen bonding, and/or other bonding mechanisms. In other examples, the particles 132 may be entrapped in the matrix of the thermoplastic, and may move or migrate with the polymer chains 148 that define the thermoplastic matrix.

In one example of covalent bonding, the particles 132 may be provided as nanoparticles that are covalently bonded to the polymer chains 148 using a silane coupling agent (not shown). For example, the silane coupling agent may be configured to react to and bond with oxides on the nanoparticle, and a functionalized end of the silane coupling agent may react to and bond with a polymer chain 148. In other examples, a silane coupling agent may be bound to the polymer chains 148. The silicon of the silane coupling agent may function as an NDI-detectable particle. In this regard, the silicon may be used as a high-Z material detectable by NDI. A high-Z material may be described as having a relatively large quantity of protons in the nucleus (e.g., greater than 20). The reactive ends of the silane coupling agent may be capped such as with another high-Z material.

The indication film 126 may include one or more types of particles 132 which may be bound to the polymer chains 148 and may provide a means for tracking or determining the migration of the polymer chains 148 during or as a result of bonding of the first composite part 102 to the second composite part 104. For example, the particles 132 may be provided as magnetic nanoparticles, high-Z particles 132 as mentioned above, and may be comprised of iron-oxide, gold, nickel, cobalt, and/or silicon. However, the particles 132 may be provided as any type of detectable component that may migrate with the active species (e.g., the polymer chains 148) in the assembly bondline 116. As indicated above, the particles 132 may be covalently bonded to the polymer chains 148 of the adhesive material that makes up the indication film 126. Alternatively, if the particles 132 are not covalently bonded to the polymer chains 148 of the adhesive material, the particles 132 may be configured such that the mobility of the particles 132 is equal to or less than the mobility of the polymer chains 148 in the indication film 126.

As indicated above, the particle regions 134 may be provided in any one a variety of different sizes, shapes, and configurations. For example, an indication film 126 may include a pattern 142 of particle regions 134 configured in a checkerboard pattern similar to the arrangement shown in FIG. 2. The shapes of the individual particle regions 134 may include circles (e.g., FIG. 12), squares, diamonds, rectangles, triangles, polygons, stars, crescents, straight stripes (e.g., FIG. 30), curved stripes, or in any one a variety of other shapes. In some examples, the particles 132 regions may have an in-plane width 136 in the range of from several nanometers (e.g., at least three nanometers) up to several hundred microns (e.g., up to 800 um or approximately 30 mils). In other examples, the in-plane width 136 may be up to several thousand microns (e.g., up to 2500 um). In still further examples, the in-plane width 136 may be as large as the adhesive layer thickness. In the present disclosure, the in-plane width 136 of a particle region 134 may be described as the maximum width or the largest dimension of a particle region 134 in the in-plane direction 110. A particle region 134 may contain a single particle bound to a polymer chain, or a particle region 134 may contain multiple particles 132 bound to one or more polymer chains 148.

The particle regions 134 in an indication film 126 may be separated from adjacent particle regions 134 (e.g., in the in-plane direction 110) by blank regions 138 that are devoid of particles 132. The distance between adjacent particle regions 134 may also be described in terms of a region spacing 140. In some examples, an indication film 126 may include a pattern 142 of particle regions 134 having an average region spacing 140 in the range of several nanometers up to the adhesive layer thickness. In other examples, an indication film 126 may be provided with a region spacing 140 that is no more than twice the average distance of in-plane direction 110 movement (e.g., migration) of a particle bound to a polymer chain 148 during the process of bonding the first composite part 102 (e.g., the indication film) to the second composite part 104. The average distance of in-plane direction 110 movement of a particle bound to a polymer chain 148 may be determined by laboratory testing and may be correlated to a minimum level of through-thickness direction 112 (e.g., z-direction) movement of the polymer chains 148 that results in a mechanically robust bond 122, as distinguished from a non-structural kissing bond 124 (FIG. 23) described above.

As indicated above, the NDI-detectable particles 132 in the indication film 126 may function as markers or tags for detecting, observing, and/or measuring the migration of the polymer chains 148 to which the particles 132 are bound. The polymer chains 148 and particles 132 may remain stationary (e.g., non-migrating) during bonding of the indication film 126 to the first composite part 102 due to immiscibility of the polymer chains 148 of the indication film 126 in the presence of the polymer chains 148 of the first composite part 102. However, the indication film 126 may contain other types of polymer chains 148 that may be bondable with the polymer chains 148 of the first composite part 102 to bond the indication film 126 to the first composite part 102.

Step 204 of the method 200 of FIG. 11 may include applying (e.g., assembling, mating) the first composite part 102 to a second composite part 104 such that the indication film 126 of the first composite part 102 is in contacting relation to the second composite part 104 along an assembly bondline 116, as shown in FIGS. 7-8. FIG. 12 is a top view of an NDI image of the assembly bondline 116 of a structural assembly 100 showing an example of a pattern 142 of circular particle regions 134 prior to thermal cycling (e.g., heating) and bonding the first composite part 102 to the second composite part 104. FIG. 13 is a section view of the structural assembly 100 of FIG. 14 showing the pattern 142 of particles 132 in the indication film 126 prior to bonding of the first composite part 102 to the second composite part 104. FIG. 14 is a magnified view of a portion of the assembly bondline 116 of FIG. 13 in a simplified illustration showing particles 132 coupled to several of the polymer chains 148 that may make up the indication film 126. Also shown in FIG. 14 are several of the polymer chains 148 that may make up the second composite part 104.

Step 206 of the method 200 may include bonding the first composite part 102 to the second composite part 104 along the assembly bondline 116 to form a structural assembly 100. FIG. 15 is a top view of an NDI image of the assembly bondline 116 of FIG. 12 during the process of bonding the first composite part 102 to the second composite part 104. FIG. 16 is a section view of FIG. 15 illustrating the pattern 142 of particles 132 in the indication film 126. FIGS. 15-16 illustrate the application of heat 176 to the structural assembly 100 to elevate the temperature of the assembly bondline 116 to a bonding temperature which may be different (e.g., higher) than the temperature at which the indication film 126 is bonded to the first composite part 102 (e.g., FIG. 5). As discussed below, the higher temperature during bonding may promote migration of the polymer chains 148, 150.

FIG. 17 is a magnified view of a portion of the assembly bondline 116 of FIG. 16 showing the migration of the polymer chains 148 in a combined in-plane direction 110 and through-thickness direction 112. As can be seen, the particles 132 in the indication film 126 migrate with the tagged polymer chains 150 during the bonding process due to miscibility of the polymer chains 148, 150 of the indication film 126 and the polymer chains 148 of the second composite part 104. In the present disclosure, miscibility may be described as the propensity for mixing of the polymer chains 148 resulting from the affinity or attraction between the polymer chains 148. Miscibility may result in movement or migration of the polymer chains 148, 150 or portions of the polymer chains 148, 150 due to affinity toward one another when in the presence of one another. The motion of the polymer chains 148 may be initiated, promoted, or enhanced by an increase in temperature (e.g., up to the glass transition temperature) of the first composite part 102 and/or the second composite part 104 at least along the assembly bondline 116. For example, elevating the temperature in the assembly bondline 116 may promote the mixing of the polymer chains 148 in the first and second composite parts 102, 104 due to a reduction in the viscosity and/or an increase in Brownian motion within the first and second composite parts 102, 104.

Step 208 of the method 200 may include inspecting the assembly bondline 116 of the structural assembly 100 using an NDI technique. For example, as indicated above and shown in FIG. 10, an NDI device 168 may be configured to inspect the assembly bondline 116 between the first and second composite parts 102, 104 along a direction locally normal to the assembly bondline 116. The NDI device 168 may be configured to observe and/or image the distribution of the particles 132 along the in-plane direction 110 of the assembly bondline 116 after bonding of the first composite part 102 to the second composite part 104. As indicated above, the method 200 may include imaging the assembly bondline 116 using any one of a variety of NDI inspection techniques including, but not limited to, eddy current testing and/or using magnetic-particle inspection wherein the particles 132 in the indication film 126 are iron, nickel, cobalt, and other alloys. Alternatively, the NDI inspection techniques may include thermography, color x-ray, computerized tomography scanning, and other inspection techniques. The method may include moving an NDI device 168 (FIG. 10) along a lateral direction 174 parallel to the local plane of the assembly bondline 116 while imaging the assembly bondline 116.

Step 210 of the method 200 may include determining the bond quality of the bond between the first composite part 102 and the second composite part 104 based on the appearance of the particles 132 when viewed along a direction normal to the assembly bondline 116. The determination of a bond quality may be based upon the degree of uniformity of particle density across the assembly bondline 116 in the in-plane direction 110. Movement of the particles 132 in the in-plane direction 110 may correspond to or may be indicative of movement of the particles 132 in the through-thickness direction 112. The method may include correlating movement of the particles 132 in the in-plane direction 110 with movement of the particles 132 in the through-thickness direction 112, such as in a laboratory setting. For example, laboratory testing may determine that a variation in in-plane particle density of no greater than approximately 20 percent across the assembly bondline 116 provides a mechanically robust bond 122.

In another example, the method may include comparing the uniformity of in-plane particle density (e.g., in the in-plane direction 110) in an image of the assembly bondline 116 of the structural assembly 100 to the in-plane particle density of a reference image (not shown) of an assembly bondline 116 of a reference standard (not shown) of the structural assembly 100. Such a reference standard may be fabricated in parallel to the fabrication of the structural assembly 100 and may be verified for through-thickness direction 112 (e.g., z-direction) migration and bonding of the tagged polymer chains 150 of the indication film 126 with the polymer chains 148 of the second composite part 104. The reference standard may represent the minimum distance of through-thickness direction 112 movement (e.g., migration) of the tagged polymer chains 150 that results in bonding of the tagged polymer chains 150 with the polymer chains 148 of the second composite part 104 to produce a high-quality bond that meets predetermined standards for strength, stiffness (e.g., modulus), and/or toughness. In one example, determination of the minimum through-thickness movement of the polymer chains 148 required for a mechanically robust bond 122 (e.g., a high-quality bond) may be performed by destructive inspection (e.g., by sectioning and electron microscopy) of the reference standard.

FIG. 18 is a top view of an NDI image of the assembly bondline 116 of FIG. 12 at the conclusion of thermal cycling of the bonding process showing a substantially uniform particle density throughout the assembly bondline 116 in the in-plane direction 110 (FIG. 20) and representing a mechanically robust bond 122. FIG. 19 is a section view of FIG. 18 showing a substantially uniform particle density in the through-thickness direction 112 (FIG. 20) throughout the assembly bondline 116. The assembly bondline 116 is made up of the first bondline portion 118 of the first composite part 102 and second bondline portion 120 of the second composite part 104. The first bondline portion 118 may be at least partially comprised of the indication film 126 previously bonded to the first composite part 102. The second bondline portion may be an outer layer or portion of the second composite part 104. FIG. 20 illustrates the migration of particles 132 with the tagged polymer chains 150 of the first composite part 102 into the second composite part 104. In addition, shown is the migration of the polymer chains 148 of the second composite part 104 into the first composite part 102. The cross-migration and coupling of the polymer chains 148 across the interface between the first and second composite parts 102, 104 results in a mechanically robust bond 122 along the assembly bondline 116.

FIG. 21 is a top view of an NDI image of an assembly bondline 116 illustrating non-uniform particle density in the in-plane direction 110 as represented by the presence of the original particle pattern 142. The non-uniform particle density may be the result of non-uniform dispersion of the particles 132, and may be caused by an insufficient thermal cycle, a contaminated surface of the first and/or second composite part 102, 104, and/or other factors. FIG. 22 is a section view of FIG. 21 and illustrates non-uniform particle density in the through-thickness direction 112 of the assembly bondline 116. FIG. 23 is a magnified view of a portion of the assembly bondline 116 of FIG. 22 and illustrates insufficient migration of the polymer chains 148 across the interface between the first composite part 102 and the second composite part 104. The lack of sufficient migration of the polymer chains 148 in the through-thickness direction 112 may be determined by correlation to a non-uniform particle density in the in-plane direction 110, and may represent a non-structural kissing bond 124 between the first and second composite parts 102, 104.

Figure 25:
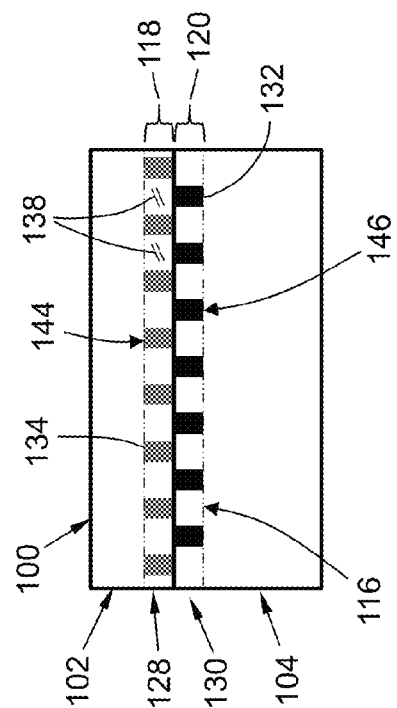
FIG. 25 is a section view taken along line 25 of FIG. 24 and illustrating the first and second indication films of the respective first and second composite parts in contacting relation prior to bonding.
Figure 24:
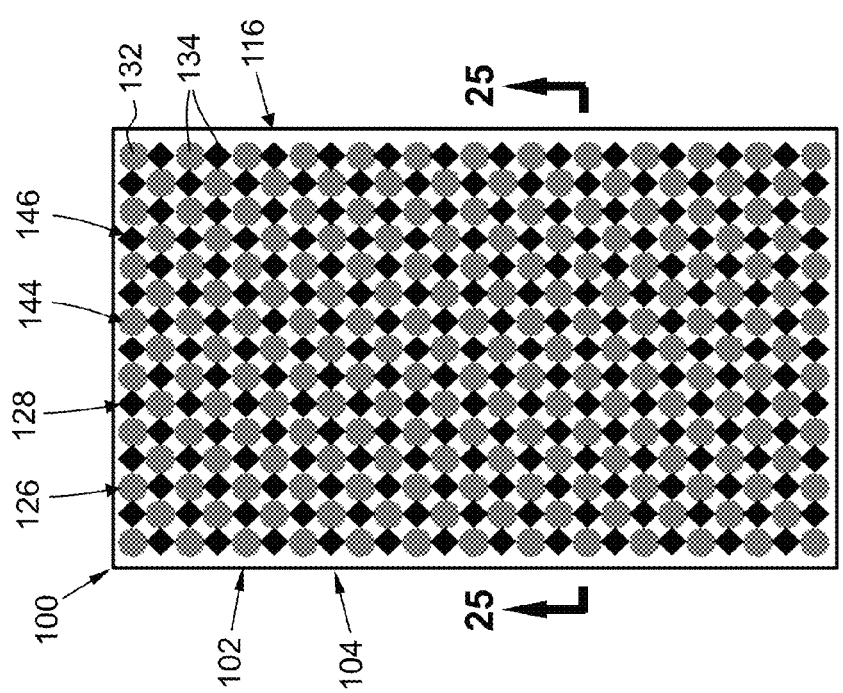
FIG. 24 is a top view of an NDI image of an assembly bondline prior to bonding of the first and second composite parts and illustrating a first pattern of circular particle regions in a first indication film of the first composite part, and a second pattern of diamond-shaped particle regions in a second indication film of the second composite part.

FIG. 24 is a top view of an NDI image of a further example of an assembly bondline 116 of a first composite part 102 and a second composite part 104 prior to thermal cycling (e.g., bonding). In the example shown, each one of the composite parts includes an indication film 126. For example, the first composite part 102 includes a first indication film 128 having a first pattern 144 of circular-shaped particle regions 134, and the second composite part 104 includes a second indication film 130 having a second pattern 146 of diamond-shaped particle regions 134. FIG. 25 is a section view of the structural assembly 100 of FIG. 24 showing the contact along the interface between the first and second indication films 128, 130 of the respective first and second composite parts 102, 104 prior to bonding. The difference in the shapes of the particle regions 134 of the first and second indication films 128, 130 may provide additional contrast in the NDI images to enhance or facilitate the detection of migration of the particles 132 and the polymer chains 148 to which the particles 132 are bound.

In examples where the structural assembly 100 includes two indication films, the above-described step of bonding the indication film 126 to the first composite part 102 includes bonding the first indication film 128 to the first composite part 102 (e.g., FIG. 5), and separately bonding the second indication film 130 to the second composite part 104. The method may include applying (e.g., assembling or mating) the first composite part 102 to the second composite part 104 such that the respective first and second indication films 128, 130 are in contacting relation with one another along the assembly bondline 116. The method may additionally include bonding the first composite part 102 to the second composite part 104 along the assembly bondline 116 such as by applying heat 176 to the structural assembly 100. During the bonding process, the particles 132 in the first and second indication films 128, 130 may migrate with the respective tagged polymer chains 150 during the bonding of the first composite part 102 to the second composite part 104 due to miscibility of the polymer chains 148 in the first and second indication films 128, 130.

Figure 29:
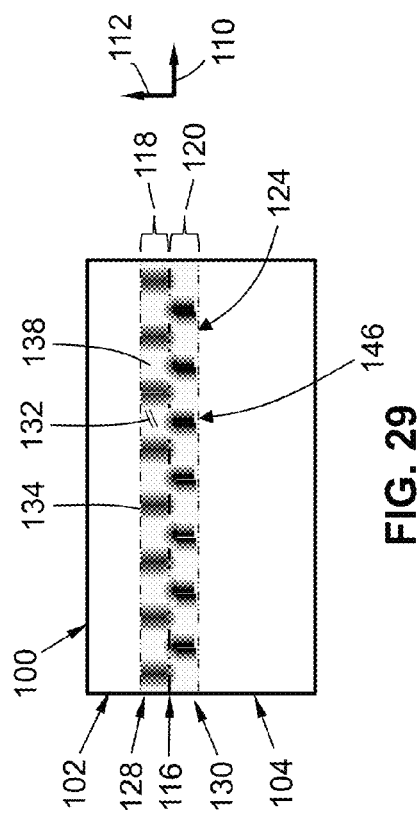
FIG. 29 is a section view taken along line 29 of FIG. 28 and illustrating non-uniform particle density in the through-thickness direction.
Figure 28:
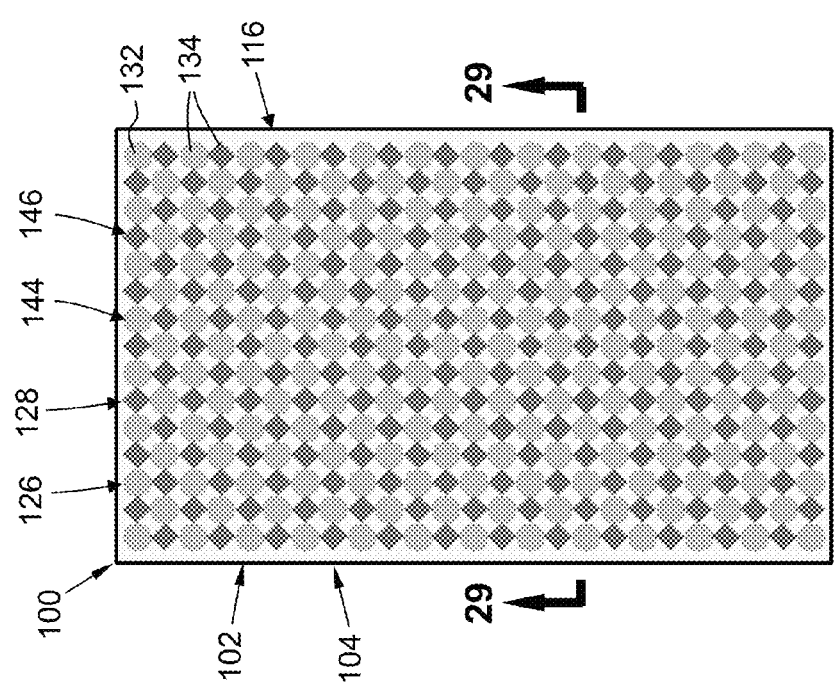
FIG. 28 is a top view of an NDI image of the assembly bondline of FIG. 24 illustrating non-uniform particle density in the in-plane direction as represented by the presence of the first pattern and second pattern.

FIG. 26 is a top view of an NDI image of the assembly bondline 116 of FIG. 24 after bonding of the first composite part 102 to the second composite part 104 showing a substantially uniform particle density in the in-plane direction 110 throughout the assembly bondline 116. FIG. 27 is a section view of the structural assembly 100 of FIG. 26 showing a corresponding substantially uniform particle density in the through-thickness direction 112 (e.g., z-direction) for the particles 132 in the first indication film 128 and second indication film 130, and indicating the occurrence of sufficient migration and coupling of the polymer chains 148 of the first and second composite parts 102, 104 resulting in a mechanically robust bond 122. In contrast, FIG. 28 illustrates non-uniform particle density in the in-plane direction 110 as represented by the presence of the first pattern 144 and second pattern 146. FIG. 29 is a section view of FIG. 28 illustrating non-uniform particle density in the through-thickness direction 112, and which may be representative of a non-structural kissing bond 124 (FIG. 23) as described above.

Figure 31:
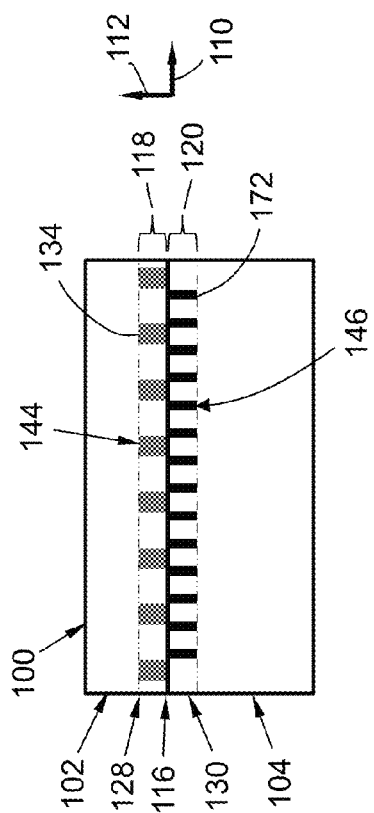
FIG. 31 is a section view taken along line 31 of FIG. 30 and illustrating the position of the particle regions of the first indication film relative to the particle regions of the second indication film.
Figure 30:
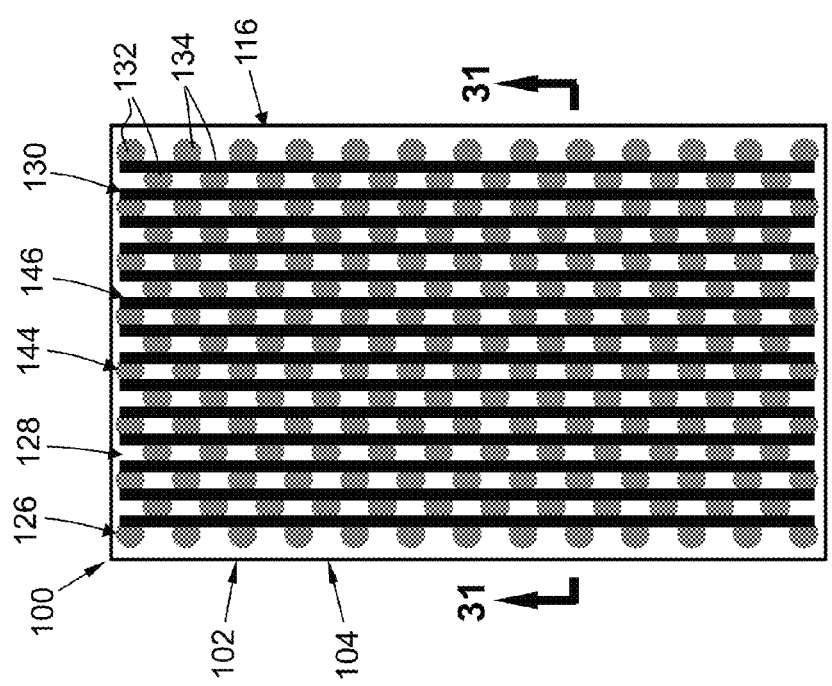
FIG. 30 is a top view of an NDI image of a further example of an assembly bondline prior to thermal cycling and illustrating a first pattern of circular particle regions in a first indication film, and a second pattern of striped particle regions in a second indication film.

FIG. 30 is a top view of an NDI image of a further example of an assembly bondline 116 formed by a first indication film 128 of a first composite part 102 applied to a second indication film 130 of a second composite part 104 prior to thermal cycling (e.g., bonding). The first indication film 128 includes a first pattern 144 of circular particle regions 134, and the second indication film 130 includes a second pattern 146 of striped particle regions 134. As indicated above, the particle regions 134 in the respective first and second indication films 128, 130 may be provided in any one a variety of different sizes, shapes, and configurations to provide additional contrast to enhance NDI imaging. FIG. 31 is a section view of FIG. 30 showing the position of the particle regions 134 of the first indication film 128 relative to the particle regions 134 of the second indication film 130. FIG. 32 shows a substantially uniform particle density in the in-plane direction 110 for the particles 132 in the first indication film 128 and the second indication film 130, and which may correspond to substantially uniform particle density in the through-thickness direction 112 as shown in FIG. 33, representing sufficient migration of the polymer chains 148 in the through-thickness direction 112 across the interface to form a mechanically robust bond 122 (e.g., a high-quality bond). FIG. 34 is a top view of an NDI image of the assembly bondline 116 of FIG. 30 illustrating non-uniform particle density in the in-plane direction 110 as represented by the presence of the first pattern 144 and second pattern 146, and which may be correlated to insufficient migration of the polymer chains 148 in the through-thickness direction 112 as shown in FIG. 35, and resulting in a non-structural kissing bond 124 (FIG. 23).

FIG. 36 is an exploded side view of an example of a structural assembly 100 comprised of a first composite part 102 and a second composite part 104 to be bonded together using a multi-layer indication film 152 during the bonding process progressively illustrated in FIGS. 37-39. The multi-layer indication film 152 may include a part adhesive layer 154 and an assembly adhesive layer 158 fused together by an insoluble layer 156. The assembly adhesive layer 158 may include particles 132 arranged in particle regions 134 containing tagged polymer chains 150. As indicated above, the tag polymer chains 148 comprise polymer chains 148 to which particles 132 are bound. For structural assemblies using the multi-layer indication film 152, the above-described Step 202 of bonding the indication film 126 to the first composite part 102 may include bonding the part adhesive layer 154 to the first composite part 102 along a part bondline 160, as shown in FIG. 37.

In some cases, the first composite part 102 may be comprised of uncured composite material (e.g., a green composite) such as a laminate formed of uncured prepreg composite plies. The part adhesive layer 154 may be formed of thermoplastic material that is soluble in the first composite part 102 to promote bonding between the part adhesive layer 154 and the first composite part 102. For example, the part adhesive layer 154 may be a sulfone such as polyethersulfone (PES) or polyphenylsulfone (PPSu). The insoluble layer 156 may be an insoluble thermoplastic layer that has desirable mechanical and/or environmental properties such as relatively high modulus, strength, toughness, and/or solvent resistant. Example materials for the insoluble layer 156 include, but are not limited to, polyetheretherketone (PEEK), polyetherketoneketone (PEKK), polyetherketone (PEK), and blends of PEEK, PEKK, or PEK with high performance sulfones. During the curing of the first composite part 102, the part adhesive layer 154 may diffuse into the first composite part 102 forming a strong bond between the insoluble layer 156 and the first composite part 102. FIG. 38 shows the multi-layer indication film 152 bonded to the first composite part 102 prior to applying the first composite part 102 to the second composite part 104 for bonding.

The above-described Step 206 of bonding the first composite part 102 to the second composite part 104 may include bonding the assembly adhesive layer 158 to the second composite part 104 as shown in FIG. 39. When the first composite part 102 is placed in contact with the second composite part 104, miscibility of the materials in the different layers may cause migration of the polymer chains 148 (e.g., thermoplastic chains) in the first bondline portion 118 (made up of the assembly adhesive layer 158) and in the second bondline portion 120 of the second composite part 104. A heat cycle may be applied to the structural assembly 100 to reduce the viscosity of the materials to facilitate the bonding process and/or promote migration and dispersion of the polymer chains 148 of the assembly adhesive layer 158 (including tagged polymer chains 150) of the first composite part 102 and the polymer chains 148 of the second composite part 104. Although not shown, an NDI image (e.g., see FIG. 32) of the assembly bondline 116 of the structural assembly 100 of FIG. 39 may show a substantially uniform particle density in the in-plane direction 110 due to migration of the particles 132 and associated polymer chains 148 of the first indication film 128 and the second indication film 130, and which may correspond to substantially uniform particle density in the through-thickness direction 112 as shown in FIG. 39.

Figure 41:
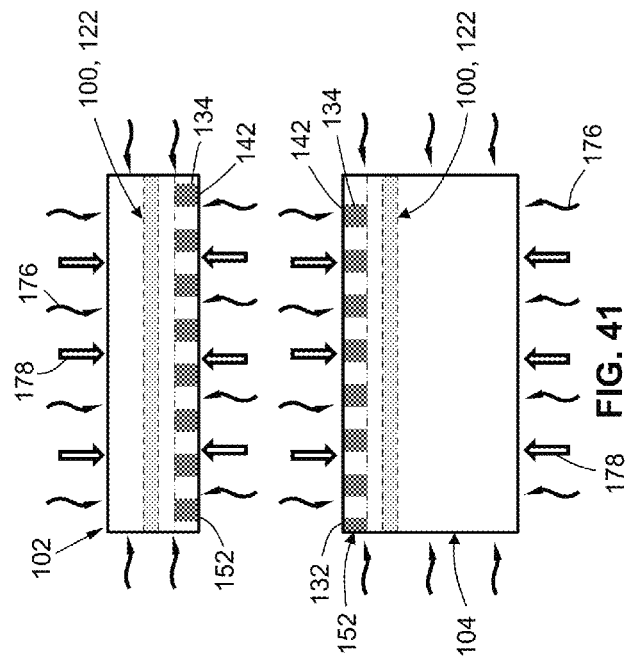
FIG. 41 is a side view of the structural assembly of FIG. 40 and illustrating the bonding of a multi-layer indication film to each one of the first and second composite parts.
Figure 43:
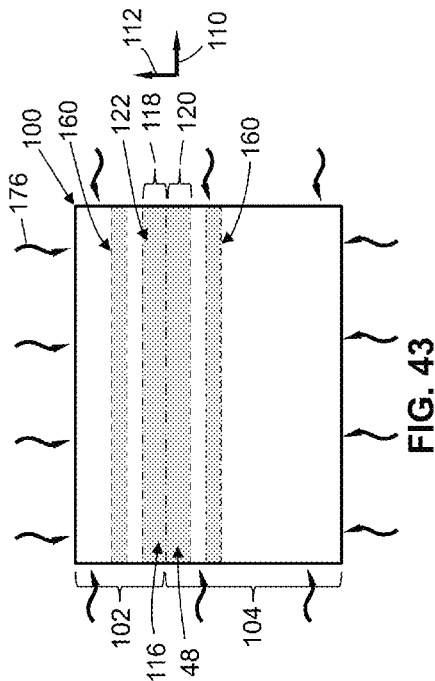
FIG. 43 illustrates the bonding of the first composite part to the second composite part along the assembly bondline between the indication films and further illustrates substantially uniform particle density in the through-thickness direction.
Figure 40:
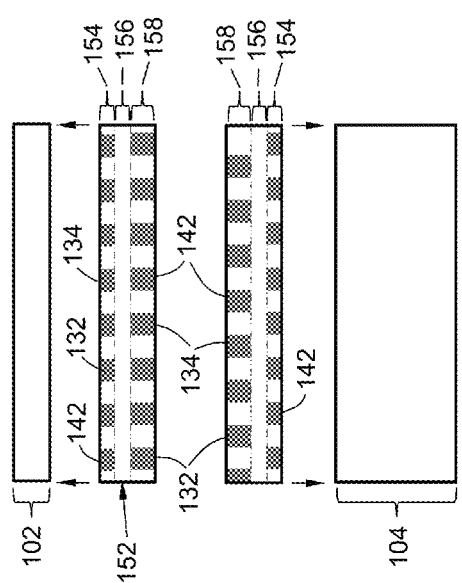
FIG. 40 is an exploded view of a pair of multi-layer indication films to be bonded to the respective first and second composite parts as part of a bonding process progressively illustrated in FIGS. 41-43.
Figure 42:
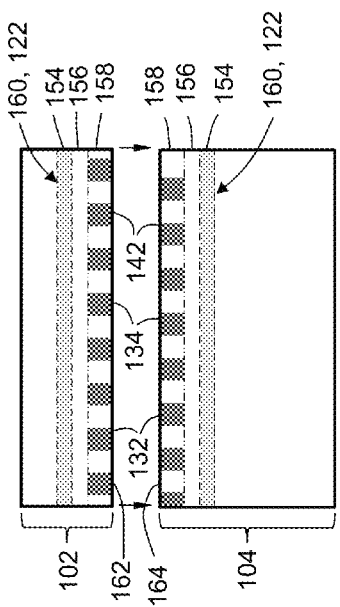
FIG. 42 is an exploded view of the multi-layer indication films bonded to each one of the first and second composite parts prior to bonding together.

FIG. 40 is an exploded view of a pair of multi-layer indication films 152 to be bonded to the respective first and second composite parts 102, 104 during a bonding process progressively illustrated in FIGS. 41-43. As indicated above, each one of the multi-layer indication films 152 includes a part adhesive layer 154 and an assembly adhesive layer 158 fused together by an insoluble layer 156. In one or both of the multi-layer indication films 152 in FIGS. 40-43, the part adhesive layer 154 may include particles 132 arranged in particle regions 134 formed in a pattern 142. The pattern 142 of particles 132 may facilitate the determination of the bond quality between a part adhesive layer 154 and the first composite part 102 and/or the second composite part 104. As indicated above, the particles 132 are bound to polymer chains 148 and define tagged polymer chains 150.

Referring to FIG. 41, when the part adhesive layer 154 is placed in contact with a first composite part 102 or with a second composite part 104, miscibility parameters between the polymer chains 148 in the part adhesive layer 154 (including the tagged polymer chains 150) and the polymer chains 148 of the first composite part 102 and/or the second composite part 104 promote migration of such polymer chains 148, 150. The application of heat 176 may also promote migration of the polymer chains 148, 150. FIG. 41 shows substantially uniform particle density in the through-thickness direction 112 (e.g., z-direction) of the part bondline 160 after the bonding of the multi-layer indication film 152 to each one of the first and second composite parts 102, 104. The above-described step of bonding the part adhesive layer 154 to the first composite part 102 and/or second composite part 104 may include inspecting the part bondline 160 using an NDI device 168 to observe the appearance of the particles 132 in the part bondline 160 along a direction locally normal to the in-plane direction 110. The method may additionally include determining the bond quality in each one of the part bondlines 160 based on the uniformity of particle density throughout the part bondline 160 in the in-plane direction 110, in a manner similar to the above-described NDI-inspection of an assembly bondline 116.

FIG. 42 shows a multi-layer indication film 152 bonded to each one of the first and second composite part 104 prior to assembling the first composite part 102 with the second composite part 104. The above-described Step 204 of applying the first composite part 102 to the second composite part 104 may comprise placing the an assembly adhesive layer 158 of the multi-layer indication film 152 of the first composite part 102 in contacting relation with the assembly adhesive layer 158 of the multi-layer indication film 152 of the second composite part 104. The above-described Step 206 of bonding the first composite part 102 to the second composite part 104 along the assembly bondline 116 may involve movement (e.g., migration) of the tagged polymer chains 150 in each one of the assembly adhesive layers 158 due to miscibility parameters and/or heat 176 which may be applied to the assembly during the bonding process. FIG. 43 illustrates the first composite part 102 bonded to the second composite part 104 along the assembly bondline 116 between the indication films 126 and further illustrating substantially uniform particle density in the through-thickness direction 112 due to sufficient cross-migration of the polymer chains 148 of the adjacent assembly adhesive layers 158.

In a further embodiment, the multi-layer indication films 152 of the first and second composite parts 102, 104 may configured as a two-part adhesive system. For example, the assembly adhesive layer 158 of the multi-layer indication film 152 of the first composite part 102 may have a first adhesive composition 162 (FIG. 42), and the assembly adhesive layer 158 of the multi-layer indication film 152 of the second composite part 104 may have a second adhesive composition 164 (FIG. 42). When the assembly adhesive layers 158 of the first and second composite parts 102, 104 are brought into contact with one another, the first adhesive composition 162 may react with the second adhesive composition 164 facilitating migration of the polymer chains 148, 150 across the interface between the assembly adhesive layers 158 and promoting the formation of a mechanically robust bond 122 (e.g., a high-quality bond). The first adhesive composition 162 and/or the second adhesive composition 164 may include a pattern 142 of particle regions 134 containing tagged polymer chains 150. The above-described steps of assembling and bonding the first composite part 102 to the second composite part 104 may cause the mixing of the first and second adhesive compositions 162, 164 and resulting in movement or migration of the tagged polymer chains 150 and NDI-detectable particles 132 to facilitate NDI-imaging of the assembly bondline 116 to prove the bond quality.

Figure 44:
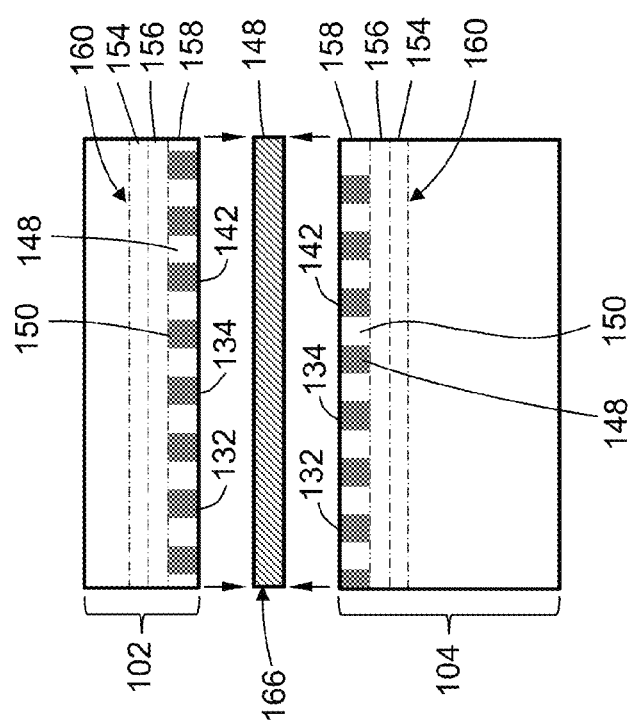
FIG. 44 is an exploded view of a further example of a structural assembly comprised of a multi-layer indication film bonded to each one of the first and second composite parts and further illustrating an intermediate adhesive layer for promoting migration of the polymer chains in the multi-layer indication films.

FIG. 44 is an exploded view of a further example of a structural assembly 100 comprised of a multi-layer indication film 152 bonded to each one of the first and second composite parts 102, 104 in the manner described above with regard to FIGS. 40-43. The example shown in FIG. 44 further includes an intermediate adhesive layer 166 positioned between the multi-layer indication films 152 of the first and second composite parts 102, 104. In the presently-disclosed method 200 of FIG. 11, the above-described Step 204 of applying the first composite part 102 to the second composite part 104 may include placing the intermediate adhesive layer 166 between the indication film 126 of the first composite part 102 and the indication film 126 of the second composite part 104 as shown in FIG. 44. The above-described Step 206 of bonding the first composite part 102 to the second composite part 104 along the assembly bondline 116 may include using the intermediate adhesive layer 166 to promote the migration of the polymer chains 148 in the assembly adhesive layer 158 of the indication film 126 of the first composite part 102 and the polymer chains 148 in the assembly adhesive layer 158 of the indication film 126 of the second composite part 104 due to miscibility with the polymer chains 148 of the intermediate adhesive layer 166.

Figure 45:
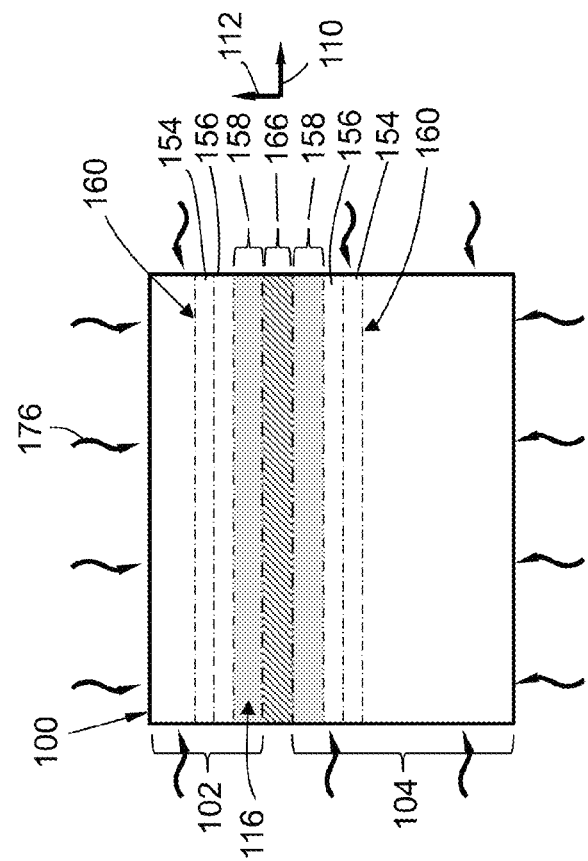
FIG. 45 is a side view of the structural assembly of FIG. 44 showing the bonding of the first composite part to the second composite part and illustrating substantially uniform particle density in the through-thickness direction.

FIG. 45 is a side view of the structural assembly 100 of FIG. 44 and illustrating the application of heat 176 during an appropriate thermal cycle for bonding of the first composite part 102 to the second composite part 104. Also shown is the substantially uniform particle density in the through-thickness direction 112 due to migration of the polymer chains 148 which may be determined by NDI-inspection (e.g., see FIG. 18) of the assembly bondline 116 to show a substantially uniform distribution of particles 132 in the in-plane direction 110, and which may be indicative of a mechanically robust bond 122 between the first and second composite parts 102, 104. In some examples, the intermediate adhesive layer 166 may have a material composition that improves the properties of the assembly bondline 116 joining the first and second composite parts 102, 104. For example, the intermediate adhesive layer 166 may be configured to increase or improve the strength, modulus, toughness, and/or solvent resistance characteristics of the assembly bondline 116.

In any one of the examples of the method disclosed herein, the first composite part 102 and the second composite part 104 may be provided in different material combinations of thermosets and thermoplastics. For example, the first composite part 102 and the second composite part 104 may both be thermosets. Alternatively, the first composite part 102 and the second composite part 104 made both be thermoplastics. In a still further example, the first composite part 102 may be a thermoset and the second composite part 104 may be a thermoplastic, or vice versa. In addition, as indicated above, the first composite part 102 and/or the second composite part 104 may be provided as uncured composites prior to bonding an indication film 126 to the first composite part 102 and/or the second composite. For example, the first composite part 102 and/or the second composite part 104 may be provided as prepreg composite laminates or as dry fiber preforms configured to be infused with resin prior to or during the bonding of an indication film 126 to the first composite part 102 and/or the second composite part 104.

In an arrangement wherein the first composite part 102 and/or the second composite part 104 is an uncured composite, the step 202 of bonding an indication film 126 to a first composite part 102 or to a second composite part 104 may include curing the first composite part 102 or second composite part 104. Alternatively, the first composite part 102 and/or the second composite part 104 may be cured prior to bonding an indication film 126 thereto. In a still further example, the first composite part 102 and/or the second composite part 104 may be uncured prior to bonding the first composite part 102 to the second composite part 104.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A method of assessing bond quality of a bond between a first composite part and a second composite part of a structural assembly, comprising the steps of:
   bonding an indication film to a first composite part, the indication film being comprised of polymer chains and including particles arranged in a pattern of particle regions, the particles being bound to the polymer chains located inside the particle regions to define tagged polymer chains and being detectable by non-destructive inspection, the tagged polymer chains and particles being stationary during bonding of the indication film to the first composite part;
   applying the first composite part to a second composite part along an assembly bondline;
   bonding the first composite part to the second composite part along the assembly bondline during which the particles in the indication film migrate with the tagged polymer chains;
   inspecting, using a non-destructive inspection (NDI) technique, the assembly bondline by observing an appearance of the particles along a direction substantially locally normal to an in-plane direction of the assembly bondline; and
   determining a bond quality of the assembly bondline based on particle density in the in-plane direction.

2. The method of claim 1, wherein the step of determining the bond quality in the assembly bondline includes:
   measuring a variation in particle density in an in-plane direction of the assembly bondline.

3. The method of claim 1, wherein the step of determining the bond quality in the assembly bondline comprises:
   comparing an NDI image of the assembly bondline of the structural assembly to a reference image of an assembly bondline of a reference standard of the structural assembly.

4. The method of claim 1, wherein the step of inspecting, using an NDI technique, the assembly bondline comprises:
   imaging the assembly bondline using at least one of eddy current testing, magnetic-particle inspection, thermography, color x-ray, and computerized tomography.

5. The method of claim 1, wherein the step of bonding the indication film to the first composite part comprises bonding a first indication film to the first composite part, the first indication film including particles arranged in a first pattern, the method further including:
   bonding a second indication film to the second composite part, the second indication film having a second pattern that is different than the first pattern in the first indication film;
   applying the first composite part to the second composite part such that the respective first and second indication films are in contacting relation with one another along the assembly bondline; and
   bonding the first composite part to the second composite part along the assembly bondline, the particles in the first and second indication films migrating with the tagged polymer chains during the bonding of the first composite part to the second composite part due to miscibility of the polymer chains in the first and second indication films.

6. The method of claim 1, further comprising:
heating the assembly bondline during the bonding of the first composite part to the second composite part.

7. The method of claim 1, wherein:
the first composite part is uncured prior to bonding to the indication film; and
the step of bonding the indication film to the first composite part comprises curing the first composite part while bonding the indication film to the first composite part.

8. The method of claim 1, wherein:
at least one of the first composite part and second composite part is uncured prior to bonding the first composite part to the second composite part.

9. The method of claim 1, wherein at least one of the first composite part and second composite part has one of the following initial configurations prior to bonding to an indication film and prior to bonding to one another:
a prepreg composite laminate containing at least one prepreg composite ply; and
a dry fiber preform configured to be infused with resin.

10. The method of claim 1, wherein the first composite part and the second composite part have one of the following material combinations:
the first composite part and the second composite part are both thermosets;
the first composite part and the second composite part are both thermoplastics; and
one of the first composite part and the second composite part is a thermoset and a remaining one of the first composite part and the second composite part is a thermoplastic.

11. The method of claim 1, wherein:
the indication film is at least partially comprised of thermoplastic material.

12. The method of claim 1, wherein:
the particles are bound to the polymer chains by at least one of covalent bonding, ionic bonding, and hydrogen bonding.

13. The method of claim 1, wherein:
the particles are nanoparticles that are covalently bonded to the polymer chains using a silane coupling agent.

14. The method of claim 1, wherein:
the particles are at least one of the following: magnetic nanoparticles, particles formed of high-Z materials including at least one of iron oxide, gold, nickel, cobalt, and silicon.

15. The method of claim 1, wherein:
the particles in the pattern are arranged in particle regions having at least one of the following shapes: circles, squares, rectangles, triangles, polygons, stars, crescents, straight stripes, and curved stripes.

16. The method of claim 1, wherein:
a particle region has an in-plane width of several nanometers up to a thickness of the indication film.

17. The method of claim 1, wherein:
the particle regions are separated from adjacent particle regions by a region spacing in a range of several nanometers up to a thickness of the indication film.

18. A method of assessing bond quality of a bond between a first composite part and a second composite part of a structural assembly, comprising the steps of:
bonding an indication film to each one of a first composite part and a second composite part, each indication film being comprised of polymer chains and including particles arranged in a pattern of particle regions, the particles being bound to the polymer chains located inside the particle regions to define tagged polymer chains and being detectable by non-destructive inspection, the tagged polymer chains and particles being stationary during bonding of the indication films to the respective first and second composite parts;
applying the first composite part to the second composite part such that the indication films are in contacting relation to one another along an assembly bondline;
bonding the first composite part to the second composite part along the assembly bondline during which the particles in the indication films migrate with the tagged polymer chains;
inspecting, using a non-destructive inspection (NDI) technique, the assembly bondline by observing an appearance of the particles along a direction substantially locally normal to an in-plane direction of the assembly bondline; and
determining the bond quality of the assembly bondline based on particle density in the in-plane direction.

19. The method of claim 18, wherein:
the indication film of the first composite part has a first adhesive composition;
the indication film of the second composite part has a second adhesive composition such that the indication films form a two-part adhesive; and
the step of bonding the first composite part to the second composite part causing mixing of the first and second adhesive compositions and resulting in movement of the tagged polymer chains and particles therewith.

20. The method of claim 18, wherein:
the step of applying the first composite part to the second composite part includes placing an intermediate adhesive layer between the indication film of the first composite part and the indication film of the second composite part; and
the step of bonding the first composite part to the second composite part along the assembly bondline includes promoting, using the intermediate adhesive layer, movement of the polymer chains of the indication films of the first composite part and the second composite part due to miscibility of the polymer chains of the intermediate adhesive layer with the tagged polymer chains of the indication films.

21. A method of assessing bond quality of a bond between a first composite part and a second composite part of a structural assembly, comprising the steps of:
bonding a multi-layer indication film to a first composite part, the multi-layer indication film having a part adhesive layer and an assembly adhesive layer fused together by an insoluble layer, the assembly adhesive layer being comprised of polymer chains and including particles arranged in a pattern of particle regions, the particles being bound to the polymer chains located inside the particle regions to define tagged polymer chains and being detectable by non-destructive inspection, the tagged polymer chains and particles being stationary during bonding of the part adhesive layer to the first composite part;
applying the first composite part to a second composite part such that the assembly adhesive layer of the indication film of the first composite part is in contacting relation to the second composite part along an assembly bondline;
bonding the first composite part to the second composite part along the assembly bondline during which the particles in the assembly adhesive layer migrate with the tagged polymer chains;

inspecting, using a non-destructive inspection (NDI) technique, the assembly bondline by observing an appearance of the particles along a direction substantially locally normal to an in-plane direction of the assembly bondline; and determining the bond quality of the assembly bondline based on particle density in the in-plane direction.

22. The method of claim 21, wherein:

the first composite part is comprised of uncured composite material; and the part adhesive layer is formed of thermoplastic material that is soluble in the first composite part.

23. The method of claim 21, wherein the part adhesive layer includes particles arranged in particle regions formed in a pattern and defining tagged polymer chains that are miscible with the polymer chains of the first composite part, the step of bonding the part adhesive layer to the first composite part including:

inspecting, using an NDI technique, the part bondline to observe an appearance of the particles after bonding the part adhesive layer to the first composite part; and determining the bond quality in the part bondline based on particle density throughout the part bondline in an in-plane direction.

* * * * *